US012809901B2

(12) United States Patent
Nelson et al.

(10) Patent No.: US 12,809,901 B2
(45) Date of Patent: Nov. 24, 2026

(54) AUTOMATED DOMAIN ADAPTATION FOR SEMANTIC SEARCH USING EMBEDDING VECTORS

(71) Applicant: Accenture Global Solutions Limited, Dublin (IE)

(72) Inventors: Paul Edward Nelson, Annapolis, MD (US); Reid Craig, III, Chicago, IL (US)

(73) Assignee: Accenture Global Solutions Limited, Dublin (IE)

( * ) Notice: Subject to any disclaimer, the term of this patent is extended or adjusted under 35 U.S.C. 154(b) by 97 days.

(21) Appl. No.: 18/673,224

(22) Filed: May 23, 2024

(65) Prior Publication Data

US 2024/0394291 A1 Nov. 28, 2024

Related U.S. Application Data

(60) Provisional application No. 63/468,449, filed on May 23, 2023.

(51) Int. Cl.
*G06F 16/334* (2025.01)
*G06F 40/242* (2020.01)
(Continued)

(52) U.S. Cl.
CPC ...... *G06F 16/3347* (2019.01); *G06F 16/3344* (2019.01); *G06F 40/242* (2020.01); *G06F 40/284* (2020.01); *G06F 40/289* (2020.01)

(58) Field of Classification Search
CPC .. G06F 16/3347; G06F 16/338; G06F 40/284; G06F 40/289; G06F 40/242;
(Continued)

(56) References Cited

U.S. PATENT DOCUMENTS 9,424,253 B2 * 8/2016 Alshinnawi ............. G06F 40/10
10,872,601 B1 * 12/2020 Acharya ............... G06F 40/295
(Continued)

FOREIGN PATENT DOCUMENTS

CN 107291914 A 10/2017
CN 109284397 A * 1/2019 .......... G06F 40/247

OTHER PUBLICATIONS

Non-final office action U.S. Appl. No. 18/807,518 dated Apr. 21, 2026, 27 pages.
(Continued)

*Primary Examiner* — Paras D Shah
*Assistant Examiner* — Nadira Sultana
(74) *Attorney, Agent, or Firm* — Seed Intellectual Property Law Group LLP

(57) ABSTRACT

Methods, systems, and computer-readable storage media for improving the accuracy of embedding vector generation for domain-specific text for purposes of semantic search and generative AI. A dictionary of domain-specific terms can be built to include embedding vectors generated for respective domain-specific terms using a pre-trained large language model. A list of domain-specific terms pertaining to a particular domain can be identified and textual content comprising a description or a definition of a respective domain-specific term can be obtained. A domain-adapted embedding vector for each domain-specific term can be generated based on the textual content for that term. The domain-specific dictionary can be built to include a combination of a domain-specific term, a corresponding domain-adapted embedding vector and the domain-specific term definition or description.

15 Claims, 10 Drawing Sheets

(51) Int. Cl.
*G06F 40/284* (2020.01)
*G06F 40/289* (2020.01)

(58) Field of Classification Search
CPC ........ G06F 40/40; G06F 40/10; G06F 40/295; G06N 3/096; G10L 15/30
See application file for complete search history.

(56) References Cited

U.S. PATENT DOCUMENTS

| | | | | |
|---|---|---|---|---|
| 11,030,999 | B1* | 6/2021 | Yu | G10L 15/30 |
| 11,263,277 | B1 | 3/2022 | Podgorny et al. | |
| 11,983,208 | B2* | 5/2024 | Osuala | G06F 16/338 |
| 2005/0065773 | A1 | 3/2005 | Huang et al. | |
| 2018/0260383 | A1* | 9/2018 | Beller | G06F 16/3329 |
| 2018/0357216 | A1 | 12/2018 | Bakis et al. | |
| 2019/0370273 | A1 | 12/2019 | Frison | |
| 2021/0232768 | A1* | 7/2021 | Ling | G06N 3/096 |
| 2022/0138170 | A1 | 5/2022 | Misiewicz et al. | |
| 2022/0138424 | A1 | 5/2022 | Gong et al. | |
| 2022/0358150 | A1 | 11/2022 | Ramkumar et al. | |
| 2023/0185840 | A1 | 6/2023 | Pancha et al. | |
| 2023/0244875 | A1* | 8/2023 | Venkateshwaran | G06F 40/289 704/9 |
| 2024/0289361 | A1* | 8/2024 | Batina | G06F 40/40 |
| 2024/0289545 | A1* | 8/2024 | Miller | G06F 40/20 |
| 2024/0362286 | A1* | 10/2024 | He | G06F 16/93 |

OTHER PUBLICATIONS

Notice of Allowance received in U.S. Appl. No. 18/807,518 dated Sep. 1, 2026. (25 Pages).

* cited by examiner

AUTOMATED DOMAIN ADAPTATION FOR SEMANTIC SEARCH USING EMBEDDING VECTORS

CLAIM OF PRIORITY

This application claims priority under 35 USC § 119(e) to U.S. Provisional Application No. 63/468,449, filed on May 23, 2023, the entire contents of which are hereby incorporated by reference in the entirety for all purposes.

TECHNICAL FIELD

The present disclosure relates to computer-implemented methods, software, and systems for data processing and searching.

BACKGROUND

Customers' needs are transforming and imposing higher requirements for process execution. Artificial intelligence (AI) finds implementations in different use cases in the context of data processing and semantic searching. Machine learning (ML) models may be trained to allow conversational interactions with user computers using natural language.

SUMMARY

Implementations of the present disclosure are generally directed to computer-implemented systems for semantic search and Generative AI.

Implementations of the present disclosure relate to systems and methods for improving the accuracy of embedding vector generation for domain-specific text for the purposes of semantic search and generative AI. The proposed systems and methods leverage a dictionary of domain-specific terms (e.g., either manually entered, derived from text search query logs or derived from the domain content itself). Embedding vectors are generated for each domain-specific term using a pre-trained large language model (trained on non-domain-specific content, such as internet content) using descriptive text gathered for each term. Descriptive text for each term may be gathered, for example, by manual entry or by scanning corresponding domain-specific content. Computing embedding vectors for any new, domain-specific input text (which may contain domain-specific terms) can include (i) identifying the domain specific terms within the input text—by scanning the text and looking up words and phrases from a dictionary of domain specific terms (ii) fetching from the dictionary, for each domain-specific term found in the input text, the domain-specific embedding vectors and the previously generated descriptions for the domain-specific terms, (iii) computing one or more generic (e.g. non-domain-adapted) embedding vectors for the original input text and (iv) combining the embedding vector(s) from step ii with the embedding vectors from step iii to produce domain-adapted embedding vectors that provide improved accuracy for embedding vector comparisons compared to non-domain-adapted embedding vectors which come directly from an LLM pre-trained on internet content only. These improved vectors can be further used to improve the accuracy of semantic search systems, which can then be used to improve the accuracy of Generative AI "grounding" (e.g., the Retrieval Augmentation Generation (RAG) model) systems that provide factual content for Generative AI from domain-specific databases. Additional techniques for further improving the accuracy of Generative AI systems are disclosed.

In a first aspect, this document describes a method for building a domain-specific dictionary of embedding vectors. In some implementations, the method includes identifying a list of domain-specific terms pertaining to a particular domain. For each domain-specific term, textual content including a description or a definition of the respective domain-specific term is obtained, and a domain-adapted embedding vector based on the textual description or definition content is generated. The method further includes generating a domain-specific dictionary, which includes both the domain-specific terms and the corresponding domain-adapted embedding vectors.

In a second aspect, this document describes a method for generating a domain-adapted embedding vector. In some implementations, the method includes receiving a phrase for generating a domain-adapted embedding vector for the phrase, scanning the phrase to identify a domain-specific term that is stored in a domain-specific dictionary, and obtaining, from the dictionary, a domain-adapted embedding vector for the domain-specific term. The method further includes generating a generic (e.g. non-domain adapted) embedding vector for the phrase using a large language model (LLM) and combining the generic embedding vector with the domain-adapted embedding vector to provide the domain-adapted embedding vector for the phrase. Possible methods for generating the generic embedding vector includes using the text as-is or using text that is modified to remove or substitute the domain-specific terms as appropriate, and then providing the text to an existing LLM to generate the embedding vector. Note that other methods are also possible.

In a third aspect, this document presents a method for generating a domain-adapted embedding vector for use in semantic searching. The method includes receiving input text (e.g. typically a phrase or sentence) for generating a domain-adapted embedding vector for use in execution of semantic searching in a context-specific data source. The input text can be scanned to identify domain-specific terms that are included/available in a domain-specific dictionary. In some implementations, one or more term descriptions can be obtained for the domain-specific terms. In some implementations, the one or more term descriptions are provided together with the input text to a Generative AI LLM with instructions to rewrite the phrase using the term descriptions in a non-domain-specific phrase (e.g., a phrase that uses words according to a general dictionary meaning that is not specific to a particular field, corporate context, slang, metaphoric style with reference to a specific isolated meaning, etc.). For example, in certain corporate environments, abbreviations can be defined for phrases based on internal context information to potentially over-ride a general accepted meaning of the abbreviation. For example, in a corporate environment X, CMS may stand for client management system, while generally, CMS stands for content management system. As another example, in a particular context, the word "concur" may be used as a noun to refer to a software tool (SAP CONCUR®), rather than to refer to a verb (indicating agreement). In cases where phrases have domain-specific terms, the phrases can be rewritten to replace the domain-specific term with another term or sub-phrase that defines the domain-specific term with terms or sub-phrases that are used without domain-specific meaning. For example, the phrase "what is the credit card number added in concur?" includes the term "concur" that is determined to be included in a dictionary of domain-specific words (e.g., defined for a software environment, or particular application). The phrase can be rewritten in the following example form without the use of domain-specific terms: "what is the credit card number added in the software application used for travel bookings and expense reimbursements?". In this example rewritten phrase, no word within that phrase can be found in the dictionary of domain-specific terms. Other example rewrites may be available and can include, partially overlap, completely overlap, or be completely different from this example rewrite, while still be considered as a non-domain-specific phrase. The non-domain-specific phrase can be used by the LLM to generate a domain-adapted embedding vector for the phrase for use in semantic searching.

In a fourth aspect, this document describes a method for indexing and retrieving domain-adapted embedding vectors for content pieces in a database such that a semantic search can be executed by matching a vector obtained for queried text with one or more embedding vectors stored in the database. The method includes receiving a request for a semantic query over a domain-specific database, the request including query text. The domain-specific database includes content pieces that are indexed with domain-adapted embedding vectors in a vector index. The method includes obtaining a domain-adapted embedding vector corresponding to the query text for use in semantic searching. The domain-adapted embedding vector corresponding to the query text can be used to search the domain-adapted embedding vector index to identify at least one relevant content pieces stored in the domain-specific database. The content piece is indexed with a domain-adapted embedding vector that match the embedding vector corresponding to the query text.

In a fifth aspect, this document describes a method for generating a vector search database. The method relates to building a domain-specific vector search database for a domain-specific store, the domain-specific vector search database including embedding vectors corresponding to domain-specific terms. In some implementations, the method includes obtaining content pieces included in the domain-specific store pertaining to a particular domain. For each content piece, textual content for domain-specific terms identified in the respective content piece is obtained. In some implementations, the method includes generating a generic embedding vector corresponding to the respective content piece using an LLM and obtaining domain-adapted embedding vectors corresponding to the domain-specific terms. In some implementations, the generic embedding vector can be combined with the domain-adapted embedding vectors to provide a combined domain-adapted embedding vector for the respective content piece. In some implementations, the content pieces indexed with corresponding combined domain-adapted embedding vectors can be stored in the domain-specific vector search database for use in semantic searching.

The present disclosure further describes systems for implementing the methods provided herein. The present disclosure also describes computer-readable storage media coupled to one or more processors and having instructions stored thereon which, when executed by the one or more processors, cause the one or more processors to perform operations in accordance with the methods described herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
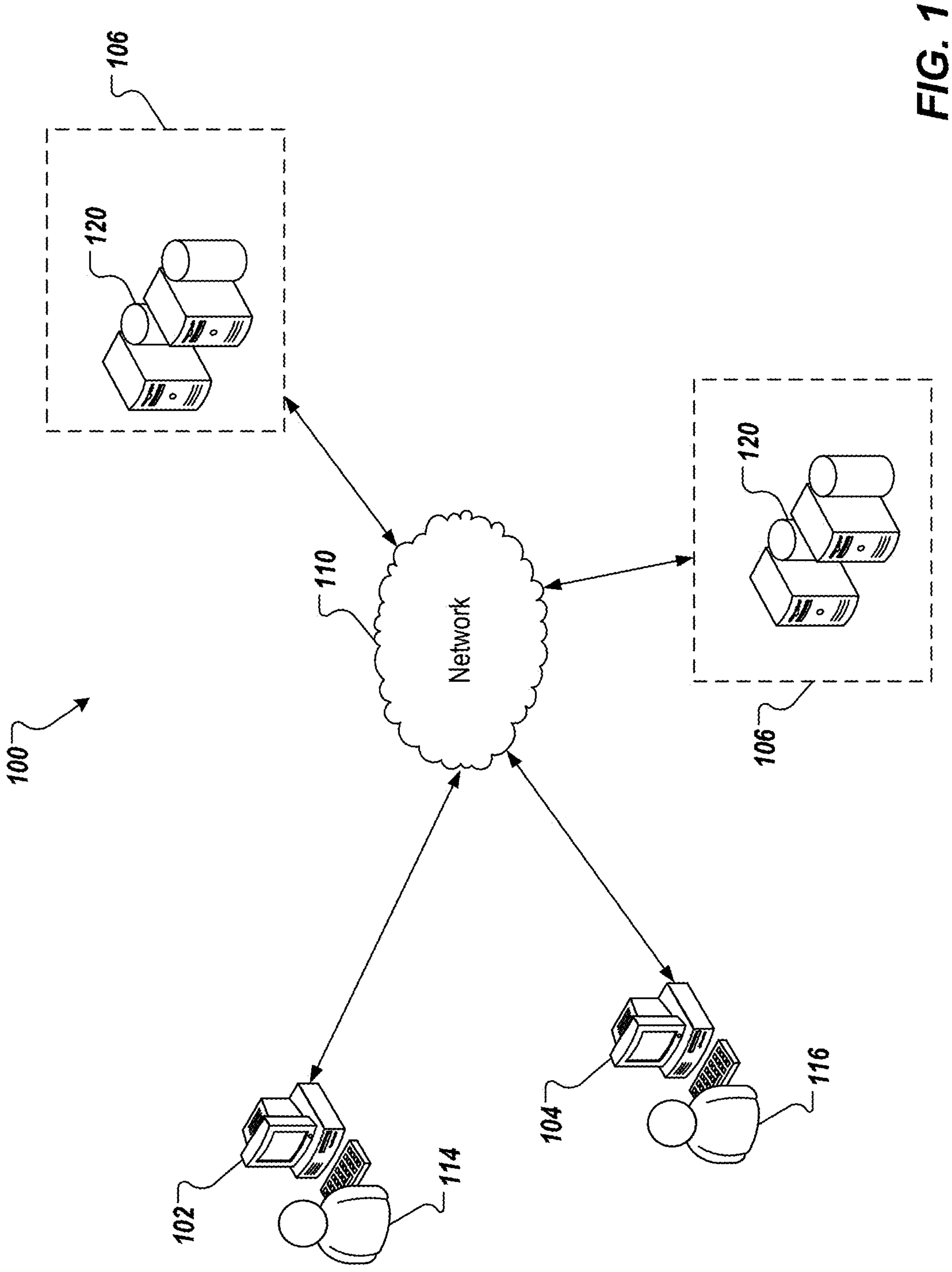
FIG. 1 depicts an example system that can execute implementations of the present disclosure.

Implementations of the present disclosure are generally directed to computer-implemented systems for computing domain-adapted embedding vectors for the purposes of semantic searching.

With the advent of generative artificial intelligence (AI) systems, there is immense potential for customizing the outputs of these systems to be particularly relevant to specific domains. This can include, for example, deriving additional context from non-public content (e.g., content which is not publicly available on the internet) and/or domain-specific content that breathes specific meaning to terms and phrases when used in particular contexts. Examples of non-public content can include content available on internal systems of businesses and other organizations such as information and facts not available to general generative AI systems or LLMs during training. The content obtained through external available systems is obtained based on an explicit consent obtained for the exchange of data. The consent for the collection and the use of the data (e.g., scope of use) can be obtained, for example, from content owners who provided the content at an external non-public data resource (e.g., end user who uploaded the content at a data source such as a data store/library). Therefore, in some instances, the content obtained from various data sources can be stored with respective regulations metadata that include information about the obtain consent and rules associated with the consent (e.g., scope of use). For example, the regulations metadata can include information about consent obtained for collecting the data from the respective source, rules for managing the data including modification and deletion of the content, and any other relevant consent of the content owner for the storage and use of the data.

In some instances, when content is obtained from external sources, processing of such content is performed according to a configured process to process the content in portions and after confirmation that consent for processing such portion is available (e.g., accessing and analyzing the data for a particular reason that is included in the scope of use defined for that portion). In some instances, different portions of the content may be associated with different scopes of use that may be overlapping, matching or distinct. In some instances, the portions of the content as processed may be of various size (equal or different between at least some portions of the portions). A portion of the content can be associated with one or more data sources from which the content is obtained.

Organizations are adopting Generative AI to support execution of various processes throughout the organization. For example, Generative AI can support communications and interactions, and processes in software systems to support decision-making within the organizations. Multiple applications within a corporate network environment can use and interact with Generative AI content or products (e.g., databases generated based on LLM techniques) to provide input and/or data for the execution of a wide variety of tasks, such as: human-computer interactions (e.g., question-answer), automation of process execution, planning, generating step-by-step procedures, performing data analytics, etc. The use of Generative AI can be enhanced by providing access to knowledge and content that is domain specific and can provide content for task execution and procedures rooted into the specific systems and processes of the organization.

For example, Generative AI techniques can be effectively used to perform (or execute) tasks based on learning techniques to generate the knowledge of an organization's domain, for example, knowledge about organizational data, available services, provided interfaces for accessing resources provided by the organization (e.g., exposed application programming languages (APIs) by products released or managed by the organization), etc. Retrieval Augmented Generation (RAG) can be used as an orchestration framework additional to a Generative AI Large Language Model (LLM), to obtain knowledge and to use such knowledge as an input (e.g. as part of the prompt) to be provided to the Generative AI LLM. The Generative AI LLM can use data obtained based on output from the RAG to answer questions for a user that are relevant to a particular domain.

However, the RAG model may not handle accurately requests that require understanding of an organization's domain language (e.g., terms within a given domain). For example, if an organization uses a special acronym, such as "LCR" to mean "Loaded Cost Rate"—this acronym may be specific to the organization, rather than a universally applicable term. For example, a RAG model may not include understanding of product names, brand names, and other proper names for business entities. For example, "Concur" in many organizations is used to reference a travel invoicing application provided by SAP® SE, and may not mean "to agree".

LLMs and Generative AI methods can be modified to understand domain terms so that "domain adapted" models can be built and used, for example, when performing semantic searches. "Non domain adapted" models are typically trained on public internet content and not on specific domain terms or content, and therefore may not be capable of understanding a proper meaning of word(s) or phrases that have a unique definition(s) within an organization, and thus maybe less accurate and reliable compared to "domain adapted" models.

In some instances, providing a domain adapted model rather than training a new LLM that understands domain specific terms (e.g., organization's special language), may be associated with the following advantages. Training a new LLM model may be resource expensive, for example, may require expensive specialized hardware (e.g., GPUs) as well as employees with specialized skills in neural network training. Thus, training a domain-adapted model may provide accurate results in a more cost-efficient way for spending computational resources compared to new model training techniques. Further, training a domain-adapted model on domain-specific terms provides flexibility for introducing new content and terms for performing retraining, and thus providing flexibility in updating models with optimized resource expenditures. The training of a domain-adapted model can be performed to target specific domain terms that may be difficult to understanding within a particular context without providing multiple examples of the terms to train the model to learn new terms from particular content pieces.

A common technique for customizing Generative AI systems is called "grounding." This includes a semantic search over private content to select content provided to the corresponding generative AI system as part of the prompt. Such "grounding" allows the Generative AI system to provide accurate outputs (e.g., facts, answers, and summaries) that is informed by relevant private content.

However, semantic search for grounding suffers when the private content uses specialized domain language terms, such as acronyms, special phrases, or unique meanings for specialized terms. As an example, the word "concur" which means "be of the same opinion" could, instead, refer to a travel booking platform SAP CONCUR® within the private content. Stated simply, asking questions like "what is concur?" for employees within a company will likely return poor results using a semantic search system because it uses uncommon terms or meanings not available when the LLM was trained. As a second example, the acronym "UCR", within a customer services business may mean "Unloaded Cost Rate", whereas it could more commonly represent the acronym "Unform Crime Reporting".

One solution to this problem could be to re-train the LLM on the private content with the specialized terms, so that the LLM can learn the true meanings of the specialized terms within the private content. However, this method has several disadvantages, including: 1) expense-training very large LLMs requires enormous amounts of computing resources and specialized skills, making retraining potentially out of reach for many organizations, 2) time-retraining of LLMs takes time, sometimes weeks or months, thereby delaying the timeline of producing accurate results, 3) accuracy—there may be a lack of the sufficient and diverse examples of the usage of domain-specific terms within private content needed to accurately retrain an LLM, and 4) domain specific terms may change rapidly, for example, when new products, technologies, or concepts are developed and describes, the LLM may need to be re-trained to facilitate the understanding of such new domain specific terms for the model so that searching that utilized one or more of such terms can be performed more accurately and without increasing the training expense for the organization.

This disclosure describes technology according to implementations of the present disclosure, semantic search can be improved by using embedding vectors by creating new "domain-adapted" vectors based on the content and using unmodified LLMs which are pre-trained on generic content, such as content from the internet.

FIG. 1 depicts an example environment 100 that can be used to execute implementations of the present disclosure. In some examples, the example environment 100 enables users associated with respective systems to perform searches that are "domain-adapted" to a specific domain context. The example environment 100 includes computing devices 102, 104, back-end systems 106, and a network 110. In some examples, the computing devices 102 and 104 are used by respective users 114 and 116 to log into and interact with the platforms and running applications according to implementations of the present disclosure.

In the depicted example, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems (e.g., the back-end systems 106). In some examples, the network 110 can be accessed over a wired and/or a wireless communications link. For example, mobile computing devices, such as smartphones can utilize a cellular network to access the network 110.

In the depicted example, the back-end systems 106 each include at least one server system 120. In some examples, the at least one server system 120 hosts one or more computer-implemented services that users can interact with using computing devices. For example, components of enterprise systems and applications can be hosted on one or more of the back-end systems 106. In some examples, a back-end system can be provided as an on-premises system that is operated by an enterprise or a third-party taking part in cross-platform interactions and data management. In some examples, a back-end system can be provided as an off-premises system (e.g., cloud or on-demand) that is operated by an enterprise or a third-party on behalf of an enterprise.

In some examples, the computing devices 102 and 104 each include computer-executable applications executed thereon. In some examples, the computing devices 102 and 104 each include a web browser application executed thereon, which can be used to display one or more web pages of platform running applications. In some examples, each of the computing devices 102 and 104 can display one or more GUIs that enable the respective users 114 and 116 to interact with the computing platform.

In accordance with implementations of the present disclosure, and as noted above, the back-end systems 106 may host enterprise applications or systems that require data sharing and data privacy. In some examples, the computing/client device 102 and/or the client device 104 can communicate with the back-end systems 106 over the network 110.

In some implementations, at least one of the back-end system 106 can be implemented in a cloud environment that includes at least one server and at least one server system 120. In the example of FIG. 1, the back-end server 106 can be a cloud environment that is intended to represent various forms of servers including, but not limited to, a web server, an application server, a proxy server, a network server, and/or a server pool. In general, server systems accept requests for application services and provide such services to any number of client devices (for example, the client device 102 over the network 110).

In some implementations, a back-end server such as the back-end system 106 can provide search capabilities that are "domain-adapted" for users, for example, requesting searches through client devices such as the computing devices 102 and/or 104.

In some implementations, to calculate domain-adapted embedding vectors, the technology described herein uses a dictionary of domain-specific terms. Each domain-specific term is associated with an embedding vector and, optionally, descriptive text, which is indicative of the domain-specific term's true meaning. Domain-specific terms can include lexical elements such as acronyms, phrases, product names, process names, proper nouns, and special meanings of standard natural language words.

Using the example above, "concur" has the following 'generic' meaning: "(1) be of the same opinion; agree. (2) happen or occur at the same time; coincide." Within a specific business context though, concur may instead refer to SAP CONCUR®—a tool that allows business employees to manage travel, expenses, and invoicing. The goal of the domain-adaptation embedding vector system is to produce embedding vectors that better represent the meaning of "Concur" within the specific domain context, as compared to the generic meaning likely interpreted by a generically trained LLM. The technology further uses the domain-adapted embedding vectors for domain-specific terms to produce domain-adapted embedding vectors for any text (for example: "How do I use concur to process my expense report?" or "What is UCR and how do I calculate it?"), which may include a mix of generic and domain-specific terminology.

The Domain Dictionary Building System

Figure 2A:
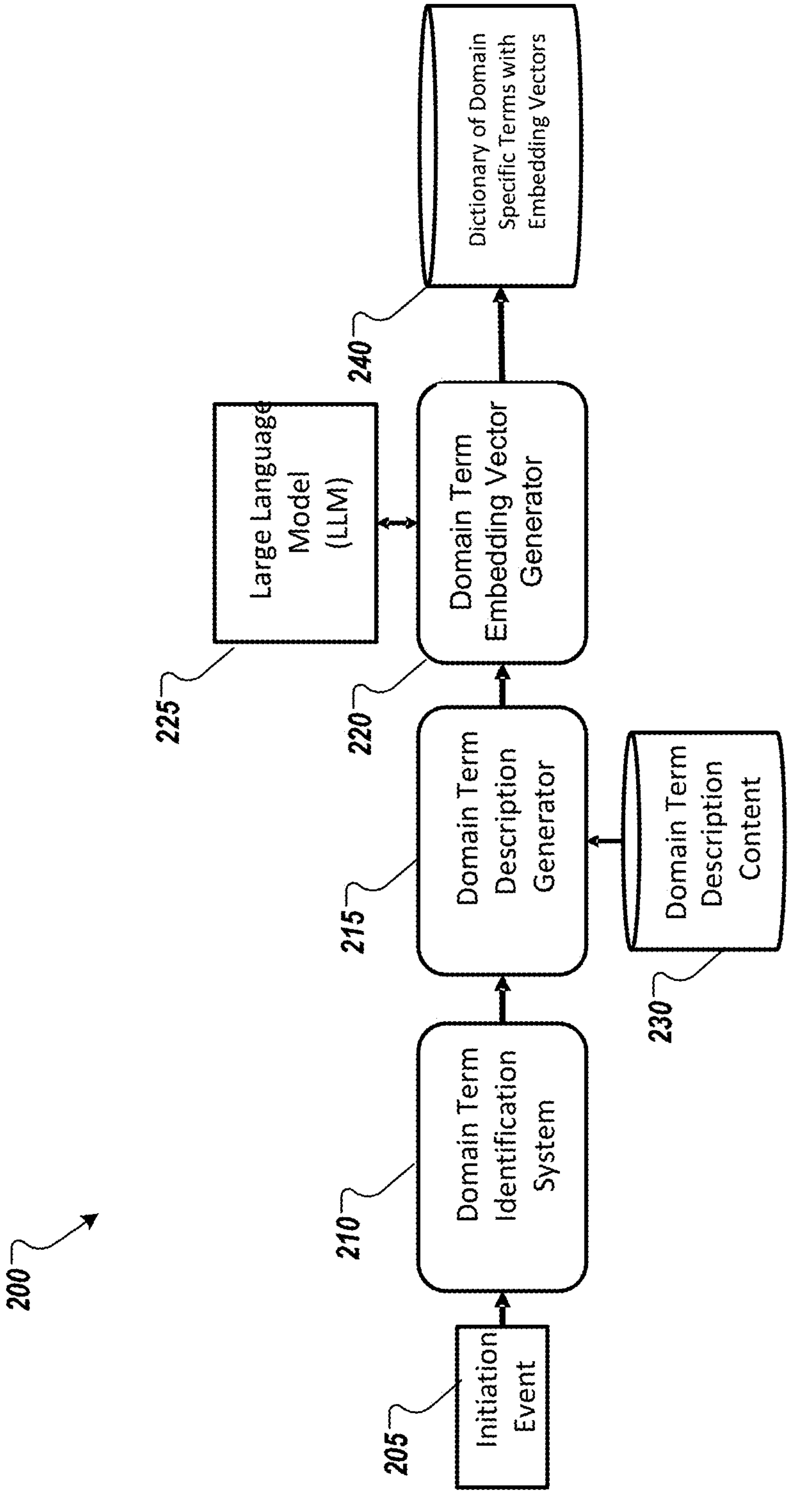
FIG. 2A is a diagram showing an example architecture of a domain dictionary building system for building a domain-specific dictionary of embedding vectors corresponding to domain-specific terms.

In some implementations, a domain dictionary building system is used to create a dictionary of domain-specific terms, with each term linked to a domain-adapted embedding vector that better represents the domain-specific meaning of the term as compared to that interpreted by a generically trained LLM. FIG. 2A is a diagram showing an example architecture of a domain dictionary building system 200 for building a domain-specific dictionary of embedding vectors corresponding to domain-specific terms.

In some implementations, to create a dictionary of domain-specific terms 240 of domain-specific terms, the domain dictionary building system 200 can execute a process to determine a list of domain-specific terms to be included in this dictionary. In some implementations, an initiation event 205 can be received to trigger the process to determine the list. The initiation event 205 can be received based on a received request to build a domain dictionary, that can be sent through an application and service, and for example, based on a user selection. In some implementations, the initiation event 205 can be a request that is received after receipt of a request for building a domain dictionary, and as a trigger for identifying relevant terms to be used to build the dictionary. In some implementations, the initiation event 205 can include one or more triggers to identify domain terms. For example, other initiation events may include events for collecting internally pre-existing dictionaries with defined terms or phrases that are mapped to internal definitions or sources. In some implementations, the process to determine the list of domain-specific terms is performed by a domain term identification system 210.

In some implementations, the domain term identification system 210 can be configured to generate a list of domain-specific terms by scanning a corpus of domain-specific content. Domain-specific terms can be identified, for example, by first finding all words and/or phrases in the domain-specific content using text processing and statistical techniques. The words and/or phrases that are identified in the content can be evaluated to determine whether those words or phrases are unique in some way when compared to their use in generic language as a whole. In some implementations, an example method for determining a "domain uniqueness" of terms in corpora can include comparing a frequency of usage of a term (word or phrase) with a frequency of usage of the term in general content. For example, the word "concur" may be much more frequently used within a company's document than it would be used be in content for general public audience. In some implementations, the determination of a term's "domain uniqueness" can be performed by comparing an embedding vector obtained from text which surrounds the term (e.g., based on a predefined criterion for defining the scope of the surrounding content around the term to be used) with an embedding vector for only the term produced by a generically trained LLM. In some implementations, the determination of the "domain uniqueness" of terms can be performed by identifying a word cloud (such as a sparse vector) of words that occur frequently with the term, and performing a comparison of this word cloud (or sparse vector) with similar word clouds (or sparse vectors) for the same term as found in generic text corpora. In some implementations, generative AI LLMs can be used to determine whether a term is being used in a particular unique meaning to a given domain, that may be an unusual use of the term, or whether the term is used to have a meaning corresponding to an available standard usage, e.g., as listed in a general language dictionary.

In some alternative implementations, the list of domain-specific terms can be determined at the domain term identification system 210 by identifying the terms from a dictionary, encyclopedia, glossary, or another appropriate source. In some instances, the terms can be identified from a data source that can be created and maintained manually for a list of terms in a particular domain, e.g., a corporate domain, or a technical field domain (e.g., medicine, computer science, etc.).

In some implementations, the list of domain-specific terms can be determined by the domain term identification system 210 by analyzing queries in a query log of searches using a search engine over domain-specific content. The queries are executed over domain-specific content matching the domain that is associated with the list of domain-specific terms. In some instances, the queries can be scored based on their search result accuracy. A subset of the queries that are associated with a score below a threshold value of accuracy can be identified and used for processing to identify domain-specific terms to be included in the list. For example, queries which result in poor signals from the user may provide relevant content for use in building a dictionary of domain-specific terms. In some cases, if a query is associated with a lower score of accuracy, the lower result may be due to presence of domain-specific terms that may have a different definition or understanding when provided in that domain compared to when used in general language. For example, queries which are abandoned, queries where users have indicated a poor rating or "thumbs down" may indicate searches over domain-specific terms that are associated with a poor searching performance (e.g., non-representative within the domain, associated with poor performance in matching of their respective meaning when used in a particular domain, associated with a specific definition (e.g., internal corporate meaning, product specific, area specific, etc.) not uniformly accepted as a definition of the term). In some instances, the threshold value to be used to identify a subset of the queries may be defined based on an accuracy scale defined for scoring the queries. The threshold value can be defined based on statistical considerations of how queries perform to provide accurate results for received requests and processing over domain-specific content. For example, the threshold value can be defined so that a predefined percentage (e.g., 10%, 20%, 40%, 60%, etc.) of the queries fall below the threshold value. In such way, that predefined percentage of the queries will be identified and processed to identify domain-specific terms for the list. In some implementations, such terms can be used to generate domain-adapted embedding vectors (for the domain-specific terms) that are to be added to the dictionary and used when performing semantic searching to provide improved results. In some implementations, when terms are identified by the domain term identification system 210, these terms are provided to a domain term description generator 215, and then the terms with their definitions are provided to generate a domain term embedding vector, at a domain term embedding vector generator 220, based on using a LLM 225.

Figure 3A:
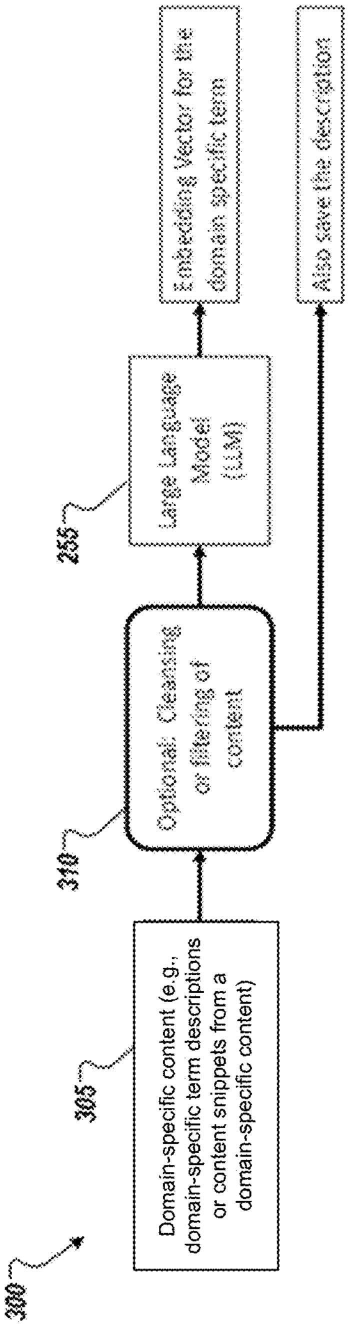
FIGS. 3A and 3B are diagrams showing examples of processing of input domain-specific content used for generating domain-adapted embedding vectors for domain-specific terms by a language model.
Figure 3B:
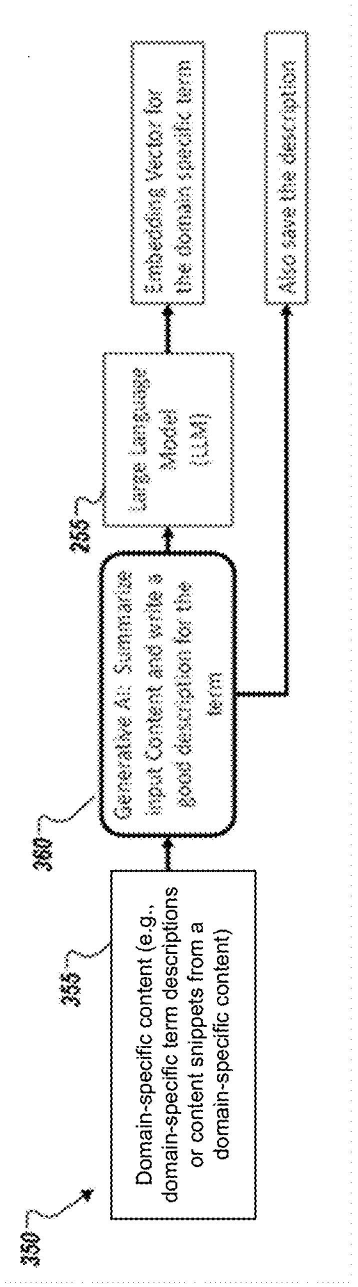

In some implementations, domain term descriptions can be generated for the terms identified by the domain term identification system 210, and further processed before being provided for generating corresponding domain-adapted embedding vectors. FIGS. 3A and 3B show examples of processes 300 and 350 for processing of input domain-specific content used for generating domain term embedding vectors by a language model. As shown in FIGS. 3A and 3B, the domain-specific term descriptions or selected content snippets for terms from domain-specific content 305 and 355 can be additionally processed to generate input that is provided to the LLM 225 to generate embedding vectors for the domain-specific terms. The domain term description content 230 of FIG. 2A, the domain-specific content 305 of FIG. 3A or domain-specific content 355 of FIG. 3B can be substantially similar with regard to the type of their content and can include particular text that either defines or uses domain-specific terms in sentences that define them by example. The domain term descriptions can be substantially similar to a language dictionary definition of a word or a phrase, or a description of a phrase in an encyclopedia. However, the domain term descriptions are descriptions that are associated with a particular definition associate with the particular domain, while other definitions in other context may still be valid interpretations of the word or phrase. In some implementations, the domain term descriptions can be obtained from internal documentation maintained by a corporate department, and/or for a software product. Such content may be not limited to size or style of content representation and formatting. When the domain term descriptions are obtained from internal documentation or through external sources, a verification is performed to determine that regulations associated with maintaining and using the obtained data. When the domain term descriptions are obtained, they are maintained only based on consent from the relevant authority, such as a particular corporate department. In some cases, the domain term description generator 215 of FIG. 2A, can use the content to generate term descriptions, for example, based on condensing, summarizing, and/or rewriting techniques that use the domain term description content as input for a generative AI LLM.

The process 300 includes obtaining the domain-specific content 305 and processing them optionally by filtering the content, at 310 of FIG. 3A, before providing them to the LLM 225. The process 360 includes obtaining the domain-specific content 355 that are used by generative AI to generate a summarized input of the content. For example, reducing the size of the content below a threshold number of characters while still maintaining the accuracy of the description. In some implementations, a summarized input can be generated, at 360, based on the domain-specific content 355 with domain term descriptions so a list of domain-specific terms with their definitions or descriptions can be generated and provided to the LLM.

Referring again to FIG. 2A, in some implementations, the processed domain term description content 230 is provided as input for generating domain term embedding vectors (at the domain term embedding vector generator 220) to the domain term description generator 215. The domain term description generator 215 can use the domain term description content 230 and generate domain term definitions. In some implementations, the domain term description generator 215 may be implemented as an external module or component of the domain dictionary building system, so that the output of the domain term description generator 215 can be externally invoked or pushed. In some implementations, the domain term description is generated based on the domain term description content 230, and can in some instances involve filtering and/or rewriting of content, for example, as performed at 310 of FIG. 3A and/or 360 of FIG. 3B. In some implementations, the domain term description generator 215 can include logic for performing filtering or for summarizing the obtained term descriptions from the domain term description content 230.

In some implementations, at least one of the processes described with reference to FIGS. 3A and 3B can be executed based on preconfigured settings defining the execution conditions of the processes. In some implementations, the processes 300 or 350 can be trigged based on a dynamic evaluation of the generated term description that indicates a need for performing filtering or summarizing, respectively. For example, a summary of the term description content may be generated for only some term descriptions, while other terms may be used without corresponding summaries. For example, terms for which the description content is above a threshold content length (e.g., in a number of characters or words), may be summarized, for example to improve the speed of processing while reducing the resource expenditures. In some examples, descriptive content may be used "as is" without summarizing, for example, based on an evaluation that the descriptive content meets a criterion for classifying the content as a good, such as based on length, source of origin, description properties, other. For example, descriptive content of an acronym that is a short acronym definition (e.g., UCR=Unloaded Cost Rate) or descriptive content directly provided from a dictionary or glossary as a dictionary definition or glossary entry may be used without summarizing.

Once a list of domain-specific terms with their respective term definitions or descriptions is determined, the domain term embedding vector generator 220 can be configured to generate, for each domain-specific term, an embedding vector, using an LLM 225. In some implementations, the LLM 225 can be a pre-trained generic LLM, which is used by the domain term embedding vector generator 220 in conjunction with the output of the domain term description generator 215 to generate the embedding vector. In some implementations, the LLM 225 can be iteratively trained to learn domain-specific terms. For example, the embedding vector can be generated based on textual content that provides additional context for a better definition and interpretation of a given term. This can result in an embedding vector that is domain-specific and provides a more accurate representation of a meaning of the term in the corresponding domain than that interpreted by a generic LLM alone. As such, the embedding vectors generated by the domain term embedding vector generator 220 is referred to herein as a domain-adapted embedding vector.

In some implementations, to generate the domain-adapted embedding vector for a domain-specific term, the domain term description generator 215 can use textual description or definition of the domain-specific term that is representative of the meaning of the term within the particular domain of interest. In some implementations, the textual description can be obtained from the domain term description content 230 (e.g., that can be a data repository storing the content) that can include different sources of textual content. For example, the domain term description content 230 can include descriptions of the domain-specific terms from the list as obtained from a domain-specific database resource. In the above example, a sample textual description of the domain-specific term "concur" (referring to "SAP CONCUR®") could be "a software application that allows employees to book travel, manage travel expenses and manage travel invoices".

In some implementations, to generate these domain-specific descriptions for domain-specific terms, a corpus of domain content can be searched to find usage of the term, and text within a threshold proximity of the term may be extracted and analyzed to determine context for the term. For example, threshold proximity may define a window of words around the term that is of a particular size, and can be specific or not about the position of the domain-specific term in the window. An appropriate description for a term can be determined in various ways. In some implementations, a concatenation of contextual text found around the term can be used as a description of the term. In some implementations, a generative AI system can be leveraged to summarize the meaning of the term based on how it is used in the corresponding text. In some implementations, a statistical analysis of words and phrases found around the term can be performed, and a set of frequently occurring words can be selected as a description of the term. In some implementations, content determined to define the term can be identified and selected to describe the term.

In some implementations, the generation of the domain-specific descriptions for domain-specific terms can be performed manually, possibly assisted by a generative AI system, and the descriptions are then stored with the corresponding term in a database. In some implementations, descriptions of domain-specific terms may be obtained from a domain-specific dictionary or encyclopedia. In some implementations, the generation of domain-specific descriptions can be obtained from external systems or web sites. For example, to determine a domain-specific meaning of the word "concur," descriptive content on "SAP CONCUR®" may be obtained from a website such as Wikipedia, or from the SAP CONCUR® website.

In some implementations, the LLM 225 can be used in conjunction with the output of the domain term description generator 215 to generate embedding vectors for the domain-specific terms. The domain-specific terms and the corresponding embedding vectors can be linked and stored as the dictionary of domain-specific terms 240. In some implementations, the dictionary of domain-specific terms 240 stores (i) the domain-specific terms that are identified by the domain term identification system 210, (ii) the corresponding descriptions as generated by the domain term description generator 215, and (iii) the corresponding domain-adapted embedding vectors as generated by the LLM 225, into a data structure which is optimized for fast lookup of domain-specific terms.

Figure 2B:
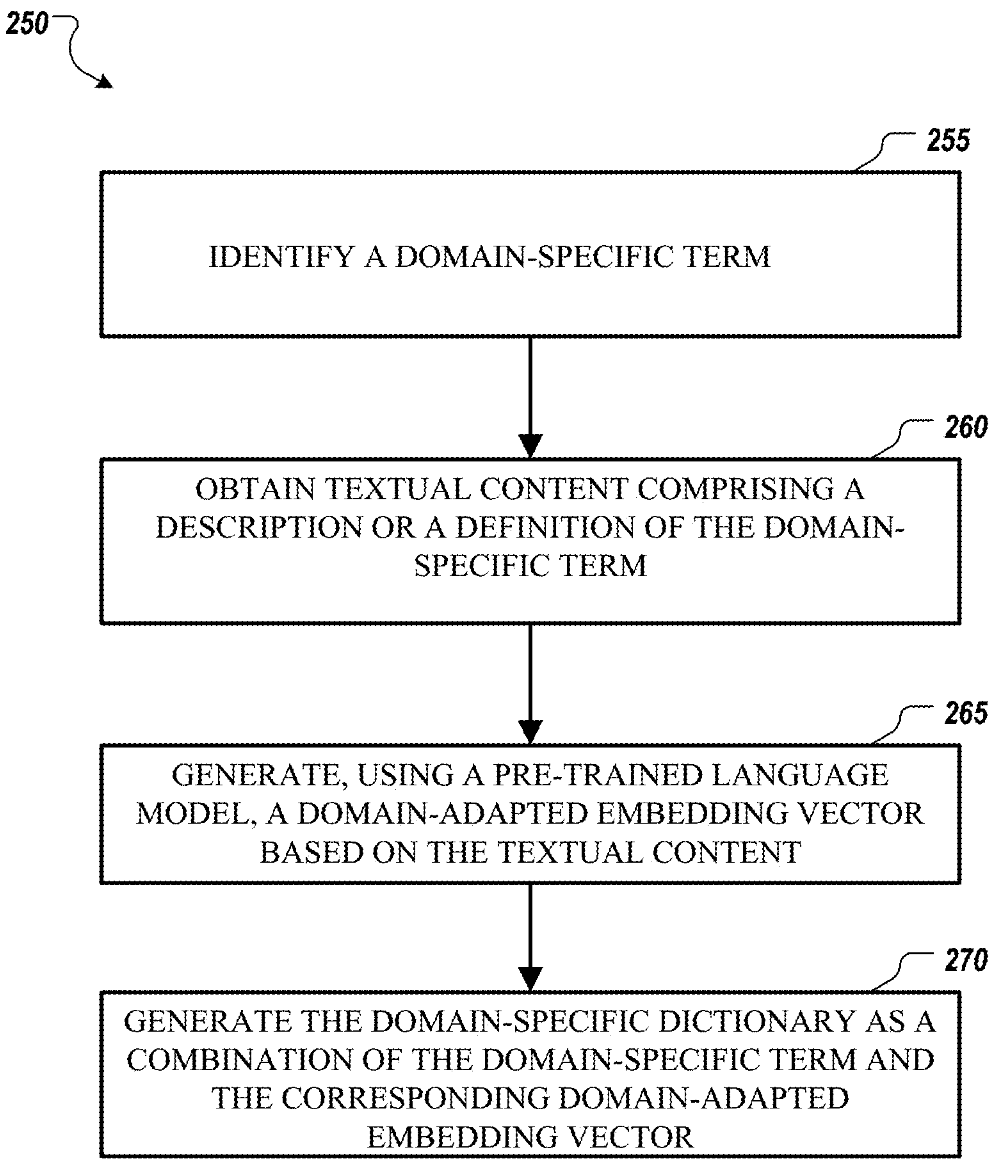
FIG. 2B is a flowchart of an example of a method for building a domain-specific dictionary of embedding vectors corresponding domain-adapted embedding vectors.

FIG. 2B is a flowchart of an example of a method 250 for building a domain-specific dictionary of embedding vectors corresponding domain-adapted embedding vectors. In some implementations, the method 250 can be executed within a system environment as described in relation to FIG. 2B, FIG. 3A, and FIG. 3B. In some implementations, the method 250 for building a domain-specific dictionary can be triggered based on an initiation event, such as the initiation event 205 of FIG. 2A. Different operations of the method 250 can be performed by components of the domain dictionary building system as described in relation to FIG. 2A.

At 255, a list of domain-specific terms is identified. The list can include terms pertaining to a particular domain, e.g., corporate environment, product specific, field specific, etc. The identification of the domain-specific terms can be done, for example, substantially as described above with respect to the operations of the domain term identification system 210 of FIG. 2A.

At 260, textual content comprising a description or a definition of the respective domain-specific term is obtained. The textual content can be obtained from a domain term description content, for example, can be done substantially as described above with respect to the operations of the domain term description generator 215 of FIG. 2A.

At 265, a domain-adapted embedding vector based on the textual content is generated using a pre-trained language model. The generation can be done, for example, substantially as described above with respect to the operations between the domain term embedding vector generator and the LLM 225 of FIG. 2A, or as substantially described above with respect to the LLM 255 of FIGS. 3A and 3B.

At 270, the domain-specific dictionary is generated as a combination of the domain-specific term and the corresponding domain-adapted embedding vector.

In some implementations, when a phrase for semantic searching is received in a search database, a domain-adapted embedding vector can be obtained from the domain-specific dictionary, as generated based on the method 250 for one or more terms in the phrase that are domain-specific and used in combination with a generic embedding vector for the received phrase for the semantic searching at a search engine as discussed in the present application.

The Domain-Adapted Embedding Vector Generator

Figure 4A:
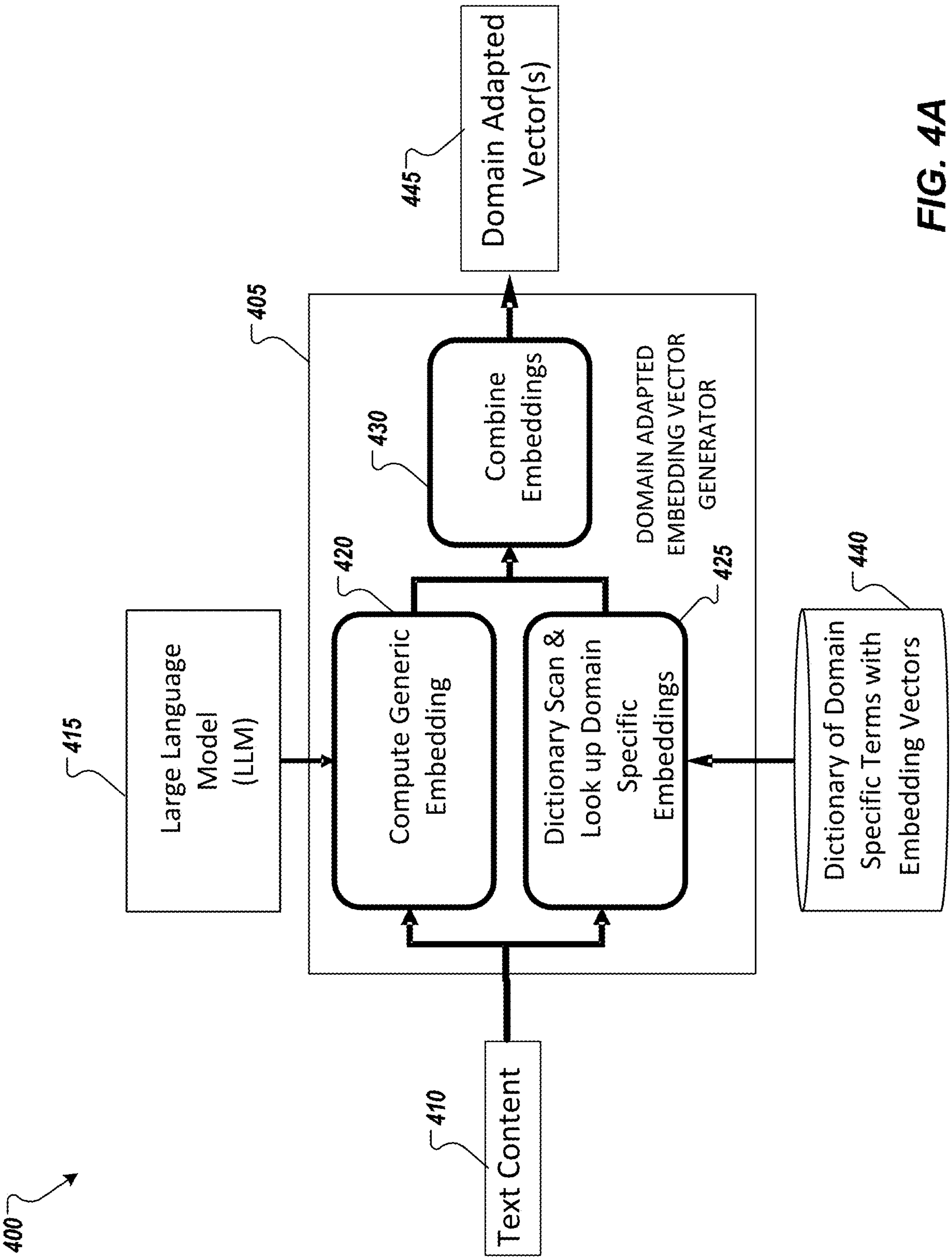
FIG. 4A is a diagram showing an example of a system environment of a domain-adapted embedding vector generator (DAEVG).

FIG. 4A is a diagram showing an example of a system environment 400 of a domain-adapted embedding vector generator (DAEVG) 405. The DAEVG 405 can be configured to use domain-adapted embedding vectors by obtaining such vectors from a dictionary of domain-specific terms with embedding vectors, such as the domain-specific dictionary that is generated at method 250 of FIG. 2B and the dictionary of domain-specific terms 240 with embedding vectors of FIG. 2A.

In some implementations, the DAEVG 405 generates a domain-adapted vector for any piece of text content 410 obtained as input for the vector generation. In some implementations, the text content 410 can include multiple domain-specific terms as well as other text. In some examples, the text content 410 can be text of a query entered by a user as input for semantic search, or a selection of text from the domain content database.

In some implementations, the DAEVG 405 generates the domain-adapted vector 445 for the text content 410 by first analyzing the text content 410 and identifying all the domain-specific terms within the text. In one embodiment, the identification of the domain-specific terms can be performed by tokenizing the text content 410 and searching for sequences of tokens in the dictionary of domain-specific terms 440 to determine if the sequence is a domain-specific term, and to subsequently identify the respective term(s).

In some implementations, the DAEVG 405 includes logic to compute generic embedding (at 420) and to perform a dictionary scan and look up domain-specific embeddings (at 425). The dictionary scan and look up of domain-specific embeddings can be performed to obtain domain-adapted vectors from the dictionary of domain-specific terms 440 for each domain-specific term found within the text content 410. In some cases, such evaluation can provide a result that zero specific terms with respective embedding vector were found and obtained from the dictionary of domain-specific terms 440. In some other cases, the evaluation can result in one or multiple matches of terms and obtaining a list of domain-adapted embedding vectors.

In some implementations, the DAEVG 405 includes logic to compute generic embeddings that are generated for non-domain-specific terms identified in the text content 410. In some implementations, the DAEVG 405 can generate a generic (i.e., non-domain-adapted) embedding vector for the entire text content 410. In some implementations, the generation can be performed by inputting all the original text of the input text content 410 into a pre-trained LLM 415 to obtain the "generic" (i.e., non-domain-adapted) embedding vector for the text content 410 as a whole. In some implementations, the text can be first "cleansed" (or filtered) of domain-specific terms and then a generic embedding can be generated on the text that excludes the domain-specific content. In such implementations, the cleansing can include removing or substituting domain-specific terms with generic replacements. For example, if the text content 410 includes the term "concur," and a domain-specific meaning of the term is identified as being the software package SAP CONCUR®, the generic embedding vector can be generated for text that does not include "concur" but rather replaces it with "travel expenses software".

The DAEVG 405 can include logic to generate, at 430, a combined domain-adapted embedding vector for the entire text. In some implementations, the combining at 430 can be performed by performing a mathematical combination of the generic, non-domain-adapted embedding vector with the domain-adapted embedding vectors of all the domain-specific terms contained within the text content 410. In some implementations, the mathematical combination can be performed using a Mean Vector calculation, e.g., in some cases by applying weights to the vectors based on statistics such as frequency of occurrence, placement within the text, etc. In some implementations, the combination of the embeddings at 430 can include other calculations or computational methods including combinations optimized by machine learning or neural networks. In some implementations, based on the combining at 430, a single domain-adapted vector is generated for the input text content 410.

In some implementations, when the DAEVG 405 obtains domain-specific terms and corresponding embedding vectors from the dictionary 440, the obtained domain-specific terms can be obtained together with term descriptions. In some implementations, the term descriptions along with the text content 410 received as input can be provided by the DAEVG 405 to a LLM as a prompt to restate the text content 410 using the term descriptions into a non-domain-specific format. The restated format of the text content 410 can be used to generate an output embedding vector that takes into account this domain-adapted rewrite based on the text description and is used to produce the domain-adapted vector 445 for the text content 410.

In some implementations, the DAEVG 405 can return multiple embedding vectors, optionally including the "generic" vector produced by the LLM 415 over the original text plus a list of the domain-adapted vectors for each of the domain-specific terms included in the input text content 410. In such implementations, the vectors for the text content (e.g., generic as generated at 420, domain-specific as generated at 425, or domain-adapted vectors 445) can be stored to be used for semantic searching. For example, the vectors can be stored in an embedding vector index and can be reused later during search time. For example, a semantic search system (e.g., as described in relation to the system environment 500 including the semantic search 540 system of FIG. 5A) can use content from stored embedding vectors for text to provide matching of vectors.

Figure 4B:
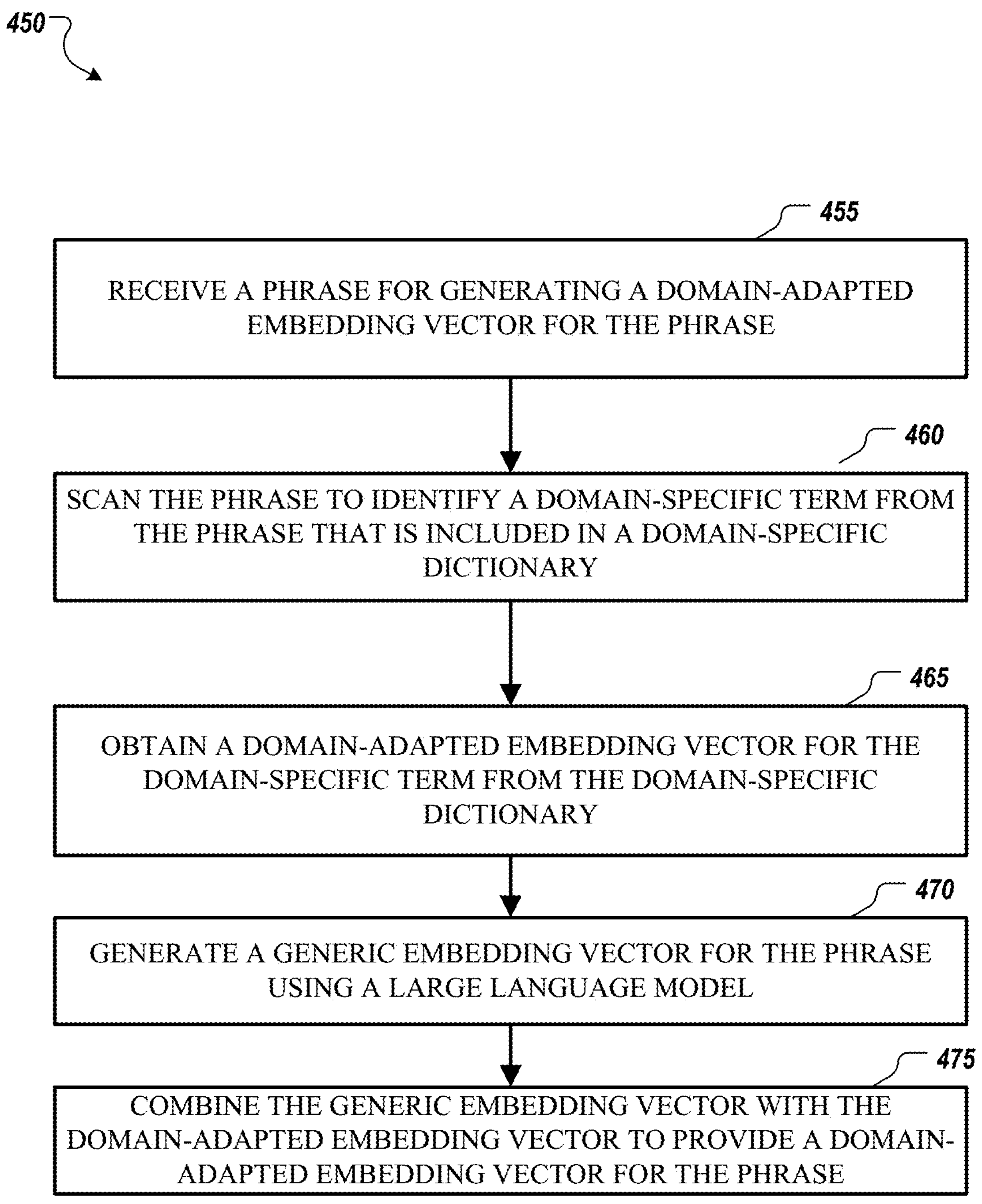
FIG. 4B is a flowchart of an example of a method for generating a domain-adapted embedding vector for a phrase to be used for semantic searching.

FIG. 4B is a flowchart of an example of a method 450 for generating a domain-adapted embedding vector for a phrase to be used for semantic searching. In some implementations, the method 450 can be executed at the example system environment 400 of FIG. 4A and at a vector generator, such as the DAEVG 405 of FIG. 4A.

At 455, a phrase for generating a domain-adapted embedding vector for the phrase is received. The phrase can be considered as text content provided for the generation of a domain-adapted embedding vector, such as the text content 410 of FIG. 4A. The phrase can be an input phrase that can include content (e.g., within a certain length criterion or any amount of content). The content can be organized in sentences, paragraphs, sections, chapters, etc., or can be a whole document of any variation or structure. In some implementations, the phrase can be tokenized into sequences of tokens. It can be determined whether the sequences of tokens are domain-specific terms in the domain-specific dictionary, and, if they are, the embedding vectors can be obtained from the dictionary.

At 460, the phrase is scanned to identify one or more domain-specific terms from the phrase that are included in a domain-specific dictionary (e.g., the dictionary 440 of domain-specific terms including embedding vectors of FIG. 4A, the dictionary of domain-specific terms 240 of FIG. 2A.)

At 465, one or more domain-adapted embedding vectors are obtained for each domain-specific term of the one or more domain-specific terms from the domain-specific dictionary. Such obtaining can be performed in a substantially similar manner to the described dictionary scan and look up at 425 of FIG. 4A.

At 470, a generic embedding vector for the phrase using a LLM is generated. The generation can be performed in a substantially similar manner as described in relation to the process of computing generic embeddings 420 that uses the LLM 415 at FIG. 4A. In some implementations, the generic embedding vector can be a non-domain-adapted embedding vector generated for the phrase as a whole.

In some implementations, the generation of the generic embedding vector can include updating the phrase from the one or more domain-specific terms by removing the one or more domain-specific terms. In some other cases, rather than removing the one or more domain-specific terms, those terms can be substituted with generic replacements corresponding to a generic definition of the respective one or more domain-specific terms. In some implementations, a combination of removing and substituting can be done so that some terms that are domain-specific can be removed and some terms that are domain-specific can be replaced. In some implementations, such determinations can be made based on a predefined rule and based on evaluation of the number of terms that are domain-specific and their proportion in the input phrase. For example, if more than three terms are domain-specific, it may be determined to remove only one of them and to replace two of them. Such determinations can be based on rules defining the number of domain-specific terms that can be removed from a phrase when generating a domain-adapted vector by a DAEVG. As another example, a rule may define that only 20% of the domain-specific terms can be removed. In such a case, when there are at least five domain-specific terms, one may be removed, and for the remaining domain-specific terms substitution may be applied (or determined not to be applied), before providing for the generation of the generic embedding vector based on the updated phrase (e.g., updated by removing at least one term, replacing at least one term, or a combination thereof).

At 475, the generic embedding vector is combined with the one or more domain-adapted embedding vectors to provide the domain-adapted embedding vector for the phrase. The domain-adapted embedding vector can be provided through a combination as discussed in relation to 430 at FIG. 4A. In some implementations, combining the generic embedding vector with the one or more domain-adapted embedding vectors can include performing a mean vector calculation of the generic embedding vector with the one or more domain-adapted embedding vectors to provide the domain-adapted embedding vector.

In some implementations, the domain-specific dictionary including terms that are searched by the domain-adapted embedding vector generator can be built as described in relation to FIGS. 2A, 2B, and 3. In some instances, the domain-specific dictionary can be built by identifying a list of domain-specific terms where each term can be processed to generate a domain-adapted embedding vector that is to be stored with the domain-specific term in the domain-specific dictionary. In some implementations, textual content for a domain-specific term can be gathered. Such content can include a description or a definition of the respective domain-specific term. A domain-adapted embedding vector can be calculated, using a pre-trained language model, based on the textual content. The domain-specific term and the domain-adapted embedding vector can be stored in the domain-specific dictionary. Such a dictionary-building process can be performed prior to and/or simultaneously with the generation of domain-adapted embedding vectors for phrases that are processed as discussed in relation to method 450 of FIG. 4B and at the system environment as part of the text content 410 of FIG. 4A. In some instances, the phrase can be provided based on a request including the phrase received at a semantic search engine for execution of a semantic search. The generated domain-adapted embedding vector for the phrase can be provided, for example, for use when searching at a domain-specific vector search database associated with a context-specific data source. The searching can be performed by comparing the provided domain-adapted embedding vector of the phrase and other vectors identified at the search database to determine a match.

In some implementations, the domain-adapted embedding vector obtained from the method 450 of FIG. 4B can be provided for storage in a domain-specific vector search database. The domain-specific vector search database can be provided for use for semantic search execution by an embedding vector similarity search.

Using Domain-Adapted Embedding Vectors in Semantic Search

A semantic search engine can be configured to perform search by computing embedding vectors of components of a search request, and determining whether the computed embedding vectors match one or more embedding vectors that are pre-computed for content which is identified as relevant for the search. For example, the one or more embedding vectors can be obtained from a dictionary storing pre-computed vectors corresponding to various content. In some implementations, such content embedding vectors can be stored in a vector index (e.g., a vector search database). In some implementations, the vector index can be a purpose-built index specifically for embedding vectors, or it can be a standard search engine with an embedding vector search extension.

Figure 5A:
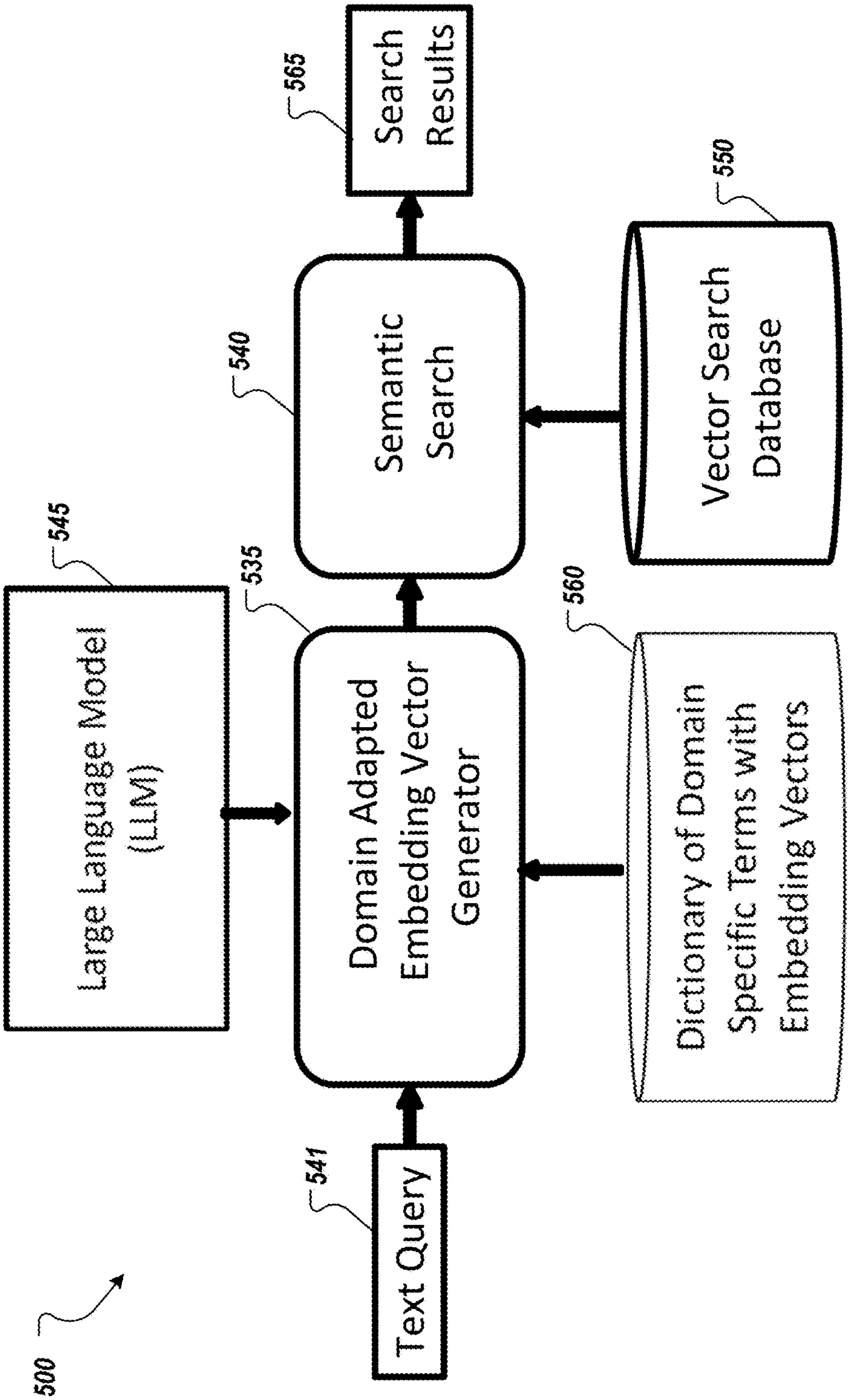
FIG. 5A is an example of a system for executing semantic searching for a text query at a vector search database.

FIG. 5A is an example of a system environment 500 for executing semantic searching for a text query 541 at a vector search database 550 based on obtained embedding vectors mapped to domain-specific terms identified in the text query 541.

In some implementations, a semantic query can be executed by a semantic search engine at the vector search database 550 where content vectors are stored. In some instances, the vectors stored at the vector search database 550 can be generated as discussed throughout the present disclosure and for example, as generated by a DAEVG such as DAEVG 405 of FIG. 4A which uses the domain term description generator 215 of FIG. 2A to compute the domain adapted vectors.

In some implementations, a semantic query includes the text query 541 that can be provided through a user, where the text query can be processed to compute an embedding vector for the query in accordance with implementations of the present disclosure. The computation of the embedding vector for the query can be performed at the DAEVG 535 and can be performed in a substantially similar way as described in relation to FIG. 4A. The DAEVG 535 can communicate with a dictionary of domain-specific terms that can correspond to the described dictionary used by the DAEVG 405 of FIG. 4A, where the dictionary can be the same as, substantially similar to, or different from the dictionary generated as described in relation to FIGS. 2A, 2B, and 3. In some instances, the dictionary of domain-specific terms 560 can be substantially similar to the dictionary of domain-specific terms 440 of FIG. 4A and/or can be built based on a process substantially similar to the process described in relation to method 250 of FIG. 2B, or as described in relation to FIGS. 2A, 4A, and 4B.

In some implementations, the DAEVG 535 can generate a query embedding vector that can be used to search the vector search database 550 (e.g., a vector index) to find the content pieces with embedding vectors that are most similar to the query embedding vector. In some implementations, a query embedding vector can be generated for the query text. The query embedding vector can be obtained by combining a generic embedding vector generated using an LLM 545 (e.g., as described in relation to 420 of FIG. 4A) with the one or more domain-adapted embedding vectors generated for domain-specific term(s) identified in the query text to provide a domain-adapted embedding vector for the query text.

In some implementations, the determination of similar query embedding vectors can be performed according to a similarity method to compute similarity. In some implementations, a mathematical similarity method that can be used to determine the similar query embedding vectors can be a dot-product method (e.g., when all vectors are normalized to unit vectors) or the similar query embedding vectors can be determined using a Neural Network that receives as input vectors to evaluate their similarity. In some implementations, the vector search database 550 can be implemented with a particular architecture to improve performance.

Based on the executed semantic search at the vector search database, a search result(s) 565 can be provided that is determined based on the similarity computations for the embedding vector for the queried text and embedding vectors for content in the vector search database 550.

Figure 5B:
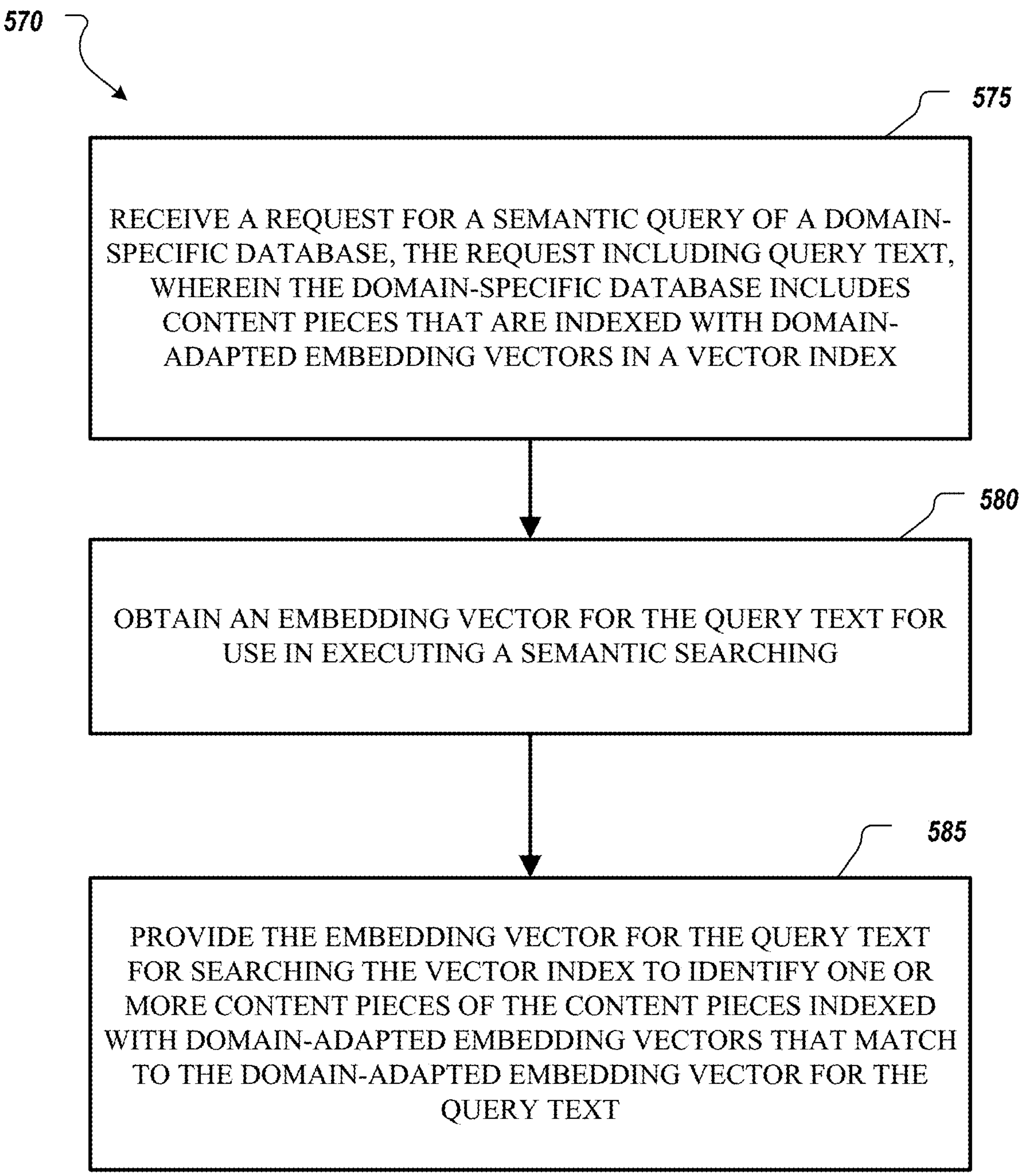
FIG. 5B is a flowchart of an example of a method for executing semantic searching for content pieces in a domain-specific database.

In some implementations, semantic search engines can be improved by using domain-adapted embedding vectors as described in relation to FIGS. 5A and 5B. For example, during indexing, content pieces from a predefined set of content within a particular context (e.g., domain context, scope, etc.) can be converted to domain-adapted embedding vectors, for example, as described in relation to FIGS. 4A and 4B (and performed by the DAEVG discussed above). The use of domain-adapted vectors that are indexed for content pieces that are to be used for semantic searching can improve the accuracy of the embedding vectors which are stored in the vector index, which can allow for more accurate semantic searches.

In some implementations, since a query text is processed (e.g., by the DAEVG) to generate a domain-adapted embedding vector to be used for the searching, the accuracy of the searching can also be improved. The generated domain-adapted embedding vector for the query text is a vector which takes domain-specific language into account.

FIG. 5B is a flowchart of an example of a method 570 for executing semantic searching for content pieces in a domain-specific database based on obtained embedding vectors. In some implementations, the method 570 can be executed at a computing environment such as the example system environment as described below for FIG. 5A. The method 570 can be executed at the DAEVG 535 that interfaces with a semantic search engine. For example, the domain-adapted embedding vector generator 535 can operate in a substantially similar manner as the DAEVG 405 of FIG. 4A for generating the embeddings based on combining of generic and domain-specific, however may include similar or different logic to look up domain-specific embeddings and which dictionary of domain-specific terms to use. For example, more than one dictionary of domain-specific terms may be scanned to identify a domain that matches the text query 541. For example, if a text query includes domain-specific terms that can be found in multiple dictionaries of domain-specific terms, a relevant dictionary to be used may be a dictionary including the highest number of identified domain-specific terms. In some implementations, other rules for selection of a relevant dictionary based on, for example, a count of terms to optimize, facilitate, expedite, or reduce costs of searching may be used.

At 575, a request for a semantic query is received at a domain-specific database. The request includes query text. In some instances, the query text can include domain-specific terms where execution of a search directly using the query text without considering the domain-specific context may not yield accurate results. In some implementations, the query text can be evaluated to determine whether it includes domain-specific terms, for example, by scanning and processing as described in relation to FIGS. 2A, 2B, and 3. In some instances, the query text can be such as the text content 410 obtained by the DAEVG 405 at FIG. 4A. In some implementations, the domain-specific database includes content pieces that are indexed with domain-adapted embedding vectors in a vector index. In some implementations, the vector index can be generated by generating domain-adapted embedding vectors based on obtained content pieces from a domain-specific database. In some implementations, the embedding vectors that are stored and provided by the vector index can be domain-adapted embedding vectors generated by scanning content pieces to identify a domain-specific term from a respective content piece. The domain-specific term can be identified based on determining that the term is included in a domain-specific dictionary, such as the dictionary of domain-specific terms 440 of FIG. 4A or the dictionary of domain-specific terms 240 of FIG. 2A. In some implementations, a domain-adapted embedding vector can be obtained for the domain-specific term of determined from the domain-specific dictionary. In some implementations, a generic embedding vector can be generated for the respective content piece using a LLM (e.g., as described in relation to 420 of FIG. 4A), and the generic embedding vector can be combined with the one or more domain-adapted embedding vectors to provide a domain-adapted embedding vector for the respective content piece.

In some implementations, the vector index can be generated based on storing domain-adapted vectors provided by a DAEVG, substantially similar as described in relation to the DAEVG 405 of FIG. 4A.

At 580, an embedding vector for the query text is obtained for use in executing semantic searching. In some instances, the embedding vector for the query text is a domain-adapted embedding vector, for example, obtained from a generic language model. In some implementations, the embedding vector for the query text can be obtained by combining a generic embedding vector generated using an LLM 545 (e.g., as described in relation to 420 of FIG. 4A) with the one or more domain-adapted embedding vectors generated for domain-specific term(s) identified in the query text to provide a domain-adapted embedding vector for the query text.

In some implementations, the embedding vector for the query text can be obtained by computing the embedding vector as a domain-adapted embedding vector based on combining a generic embedding vector generated for the query text and a domain-adapted embedding vector for a domain-specific term.

At 585, the embedding vector is provided for searching the vector index to identify one or more content pieces of the content pieces in the domain-specific database. The one or more content pieces can be indexed with one or more domain-adapted embedding vectors, where each of the one or more domain-adapted embedding vectors can be matched with the embedding vector obtained for the query text to provide a search result. In some implementations, the searching at the vector index can be based on a cosine similarity method to compute similarities between the domain-adapted embedding vector and each of the embedding vectors in the vector index to determine the match. In some implementations, the cosine similarity method may be replaced with other methods, such as dot-product (for example, when all vectors are unit-length vectors) or a neural network specially trained to provide the similarity of two input vectors.

Figure 6A:
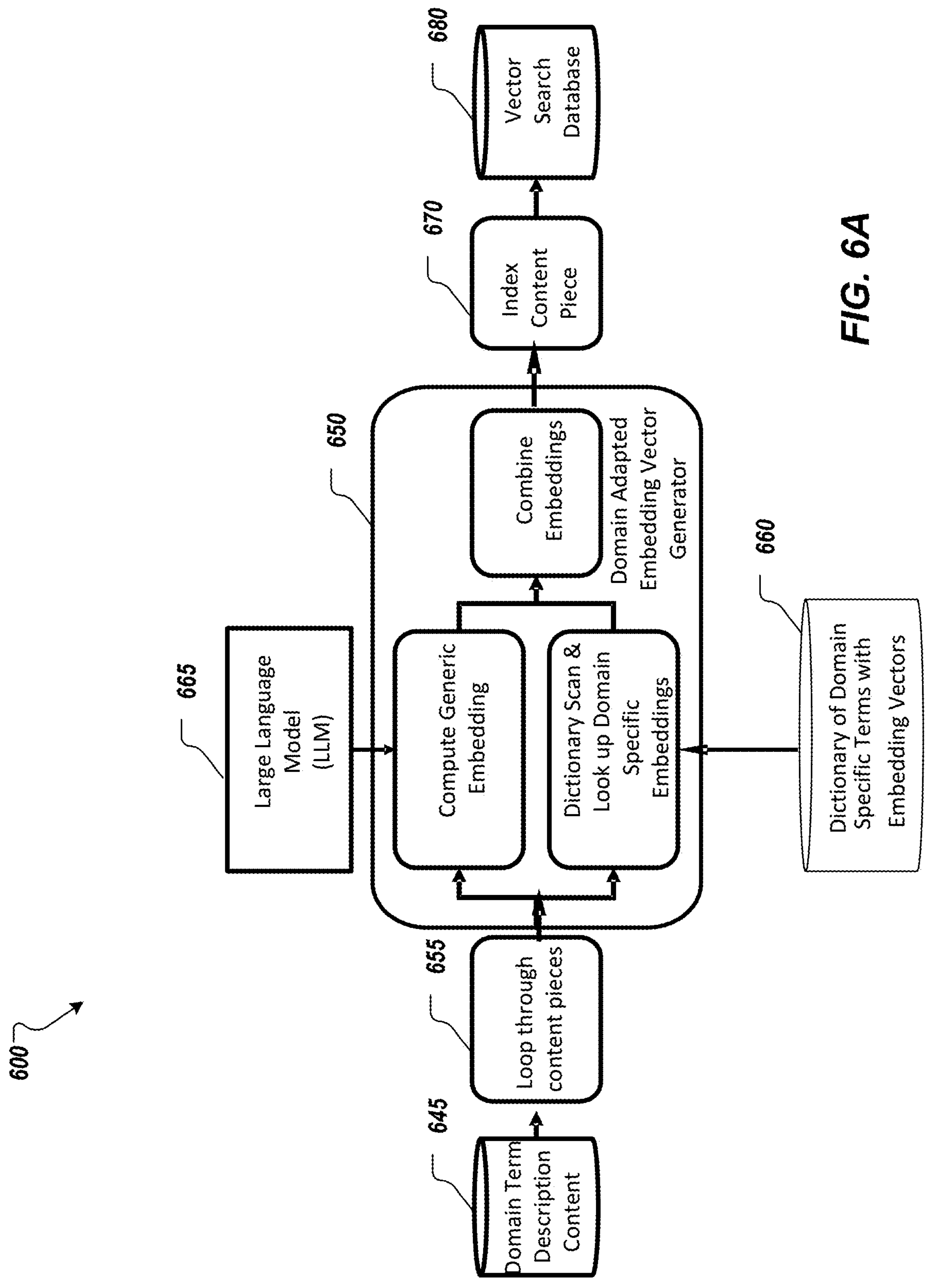
FIG. 6A is a diagram showing an example of a system for building a domain-specific vector search database.

FIG. 6A is a diagram showing an example of a system environment 600 of a DAEVG in use for building a domain-specific vector search database.

The system environment 600 includes components that can be configured to obtain content as input and generate domain-adapted embedding vectors for content pieces that can be stored at a vector search database 680 and used when executing a semantic search, for example, as discussed in relation to FIGS. 5A and 5B.

In some implementations, the vector search database 680 can be generated to cover a particular domain or a group of domains. A given domain(s) can be associated with specific terms, where such terms occur in context in text and can provide a meaning that is domain-specific. Thus, domain term description content 645 can be obtained and scanned at 655. In some implementations, the DAEVG 650 can obtain the content pieces and identify domain-specific terms (by looking up at the dictionary of domain-specific terms 660) and generate embedding vectors in a manner substantially similar to that as described in relation to FIGS. 4A and 4B. In some implementations, the dictionary of domain-specific terms includes domain-specific terms identified in a particular domain, for example, as described in relation to FIGS. 2A and 2B, and includes embedding vectors generated for the domain-specific terms. The DAEVG 650 can scan through a dictionary of domain-specific terms 660 that can be substantially similar to the dictionary of domain-specific terms 240 of FIG. 2A, the dictionary 440 of FIG. 4B, or the dictionary of domain-specific terms 560 of FIG. 5A. When the dictionary is scanned, and in some cases, at least one domain-specific term can be identified for each content piece, and each content piece can be processed as described with reference to FIGS. 6A and 6B. The LLM 665 can be used to generate a generic embedding vector for the content piece, as described in relation to operation 615 of method 640 of FIG. 6B, and textual content for domain-specific terms can be obtained from the dictionary 660.

In some implementations, a domain-adapted embedding vector can be generated for a content piece by combining the generic embedding vector for the content piece and the one or more domain-adapted embedding vectors for the domain-specific terms from the content piece. The domain-adapted embedding vectors for each of the content pieces from the obtained domain term description content 645 can be stored at the domain-specific vector search database 680, where each content piece can be indexed at 670.

Figure 6B:
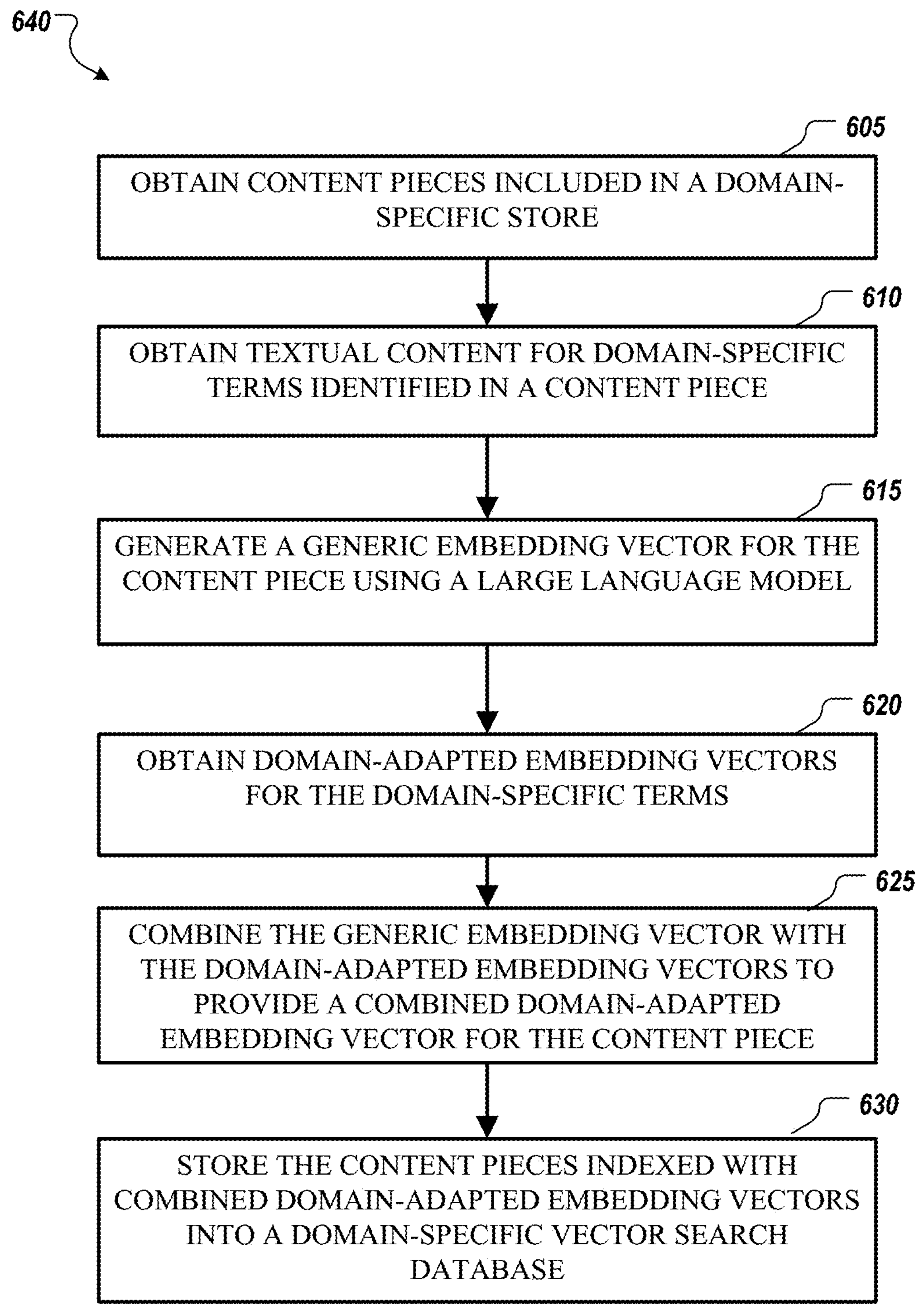
FIG. 6B is a flowchart of an example of a method for building a domain-specific vector search database for a domain-specific store.

FIG. 6B is a flowchart of an example of a method 640 for building a domain-specific vector search database for a domain-specific store. The method 640 can be executed using domain-adapted embedding vectors as described in relation to FIGS. 2A, 2B, 3, 4A, 4B, 5A, 5B, and 6A.

In some implementations, the domain-specific vector search database includes embedding vectors corresponding to domain-specific terms in a substantially similar manner as the vector search database 550 of FIG. 5A, where the embedding vectors can be generated as described in relation to FIGS. 4A and 4B.

At 605, content pieces included in the domain-specific store pertaining to a particular domain are obtained. In some implementations, the content pieces are obtained in a substantially similar manner as discussed in relation to FIG. 6A from a domain term description content 645 and looped through, at 655. In some implementations, the domain-specific store can be a data repository including domain-specific content substantially similar to the domain-specific content 305 of FIG. 3A and 355 of FIG. 3B. For each content piece, textual content for domain-specific terms identified in the respective content piece can be obtained at 610. A generic embedding vector corresponding to the respective content piece can be generated, at 615, using an LLM. The used LLM for the generic embedding vector's generation can be substantially similar to the LLM 665 of FIG. 6A and the generation can be done in a substantially similar manner as described, for example, in relation to computing generic embedding at 420 and the LLM 415 of FIG. 4A.

At 620, domain-adapted embedding vectors corresponding to the domain-specific terms can be obtained. In some implementations, the obtaining of the domain-adapted embedding vector can include obtaining the domain-adapted embedding vector from a domain-specific dictionary, for example, as described throughout the present disclosure and in particular in relation to FIG. 4A. In some implementations, the domain-specific dictionary can be built from a log of executed queries gathered from a user application. The executed queries can be gathered based on evaluation of metrics defining a criterion for a type of action included in the respective queries.

The generic embedding vector can be combined, at 625, with the domain-adapted embedding vectors to provide a combined domain-adapted embedding vector for the respective content piece.

At 630, the content pieces indexed with combined domain-adapted embedding vectors can be stored in the domain-specific vector search database to be used for executing semantic searching.

In some implementations, the method 640 can further include receiving a request for a semantic query at the domain-specific store, where the request includes query text. An embedding vector for the query text can be obtained for use in executing a semantic search. The embedding vector for the query text can be provided for searching the domain-specific vector search database to identify one or more content pieces of the content pieces stored with domain-adapted embedding vectors that match the domain-adapted embedding vector for the query text.

Improving the Accuracy of Generative AI Over Specialized Domain Content

In some implementations, the technology described herein can be used to improve the accuracy of generative AI systems in multiple ways.

In some instances, implementations of the present disclosure can improve the accuracy of raw semantic searches as discussed above. This improves the accuracy of the content evaluations which are extracted from the specialized domain content and then used as grounding to the generative AI. In some instances, the specialized domain content can be provided as part of a prompt as a mode of interaction with the LLM to request the generation of output. The prompt provided can be such that the prompt "grounds" the generative AI system to the facts as represented in the domain-specific content store. In some examples, the "grounding" can include the usage of domain-specific terms that can be enhanced by including the definitions and descriptions for domain-specific terms into the prompt for their generation. The "grounding" can facilitate the LLMs to provide answers to questions based on those facts and that content. For example, if the semantic search engine is more accurate, then the content pieces provided to the generative AI prompt will be more accurate, and therefore the responses from the generative AI system will be more accurate. In some implementations, the use of the descriptions of the domain-specific terms can support further improvements of the accuracy of the generative AI system. The domain-specific terms that are identified in the input request can be looked up in the dictionary created by the Domain Dictionary Building System (as described in relation to FIGS. 2A and 2B). Then, instead of fetching the domain-adapted embedding vector for each domain-specific term, the textual description of the term (used to generate the domain-adapted embedding vector) is fetched instead. The system presents the domain-specific terms plus their descriptions as part of the prompt to aid the generative AI system to perform requested tasks using the correct meanings of the domain-specific terms represented in the request.

Note that, in addition to accuracy, the technology described herein can also improve performance and lower costs for data storage, indexing, and/or searching as compared existing available methods for those. With a more accurate semantic search, the technology can return fewer and smaller, more accurate (e.g., higher quality) content pieces from a content store to use as grounding for a generative AI prompt as compared to existing techniques for generating generative AI prompt and/or identifying content matches when searching in a database based on AI prompts. This means that the prompt will be smaller (e.g., compared to a prompt that can not achieve the same or better accuracy), which results in fewer tokens to be processed, better performance and less expense.

In some implementations, not only are domain-adapted embedding vectors used to improve semantic search, but also domain-specific descriptions of domain-specific are fetched as well. Then both the content pieces and the domain-specific descriptions are provided as part of the generative AI to not only ground the system but also to provide descriptions for the terms used. This provides more information to the generative AI system which will produce a more accurate response as compared to a result that can be based on more data and/or data that is obtained without consideration a domain-specific meaning of a term.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

EXAMPLES

The technology described herein can be defined in accordance with the following examples:

Example 1. A computer-implemented method for computing domain-adapted embedding vectors for text content using a pretrained Large Language Model (LLM) for the purpose of semantic search, the vectors being more accurate for content from a specialized domain, the method including:

- receiving, by a dictionary building system, an initiation event to build a dictionary of domain-specific terms, each with a domain-adapted embedding vector, wherein
  - upon receiving the initiation event, the dictionary building system identifies a list of domain-specific terms; and
  - for each domain-specific term the dictionary building system gathers textual content for each domain-specific term, said content containing text which is not domain-specific; and
  - calculating an embedding vector for the description or definition of each domain-specific term; and
  - storing the domain-specific term and its embedding vector into a dictionary.

receiving, by a domain-adapted embedding vector generator, some text, possibly containing domain-specific terms, for which an improved embedding vector is required, wherein;

the domain-adapted embedding vector generator scans the text to identify domain-specific dictionary terms from a dictionary; and fetching pre-computed embedding vectors for each dictionary term found in the text; and generating a generic embedding vector from the text using a large language model; and combining the generic embedding vector from the large language model with the zero or more embedding vectors from the domain-specific dictionary terms found in the text to produce a new and more accurate domain-adapted embedding vector;

returning the domain-adapted accurate embedding vector so it can be used for improved embedding vector matches for semantic search over content that falls within the specialized domain.

Example 2. The method according to Example 1, where the embedding vector generator is used to generate domain-adapted embedding vectors for text content pieces which could contain domain-specific terms, and then storing those domain-adapted embedding vectors into a vector database so they can be used for semantic search by embedding vector similarity search, the results of which would be more accurate than using generic LLM vectors without domain adaptation.

Example 3. The method according to Example 1, where the embedding vector generator is used to generate domain-adapted embedding vectors for text queries which could contain domain-specific terms, and then using those domain-adapted embedding vectors for semantic search over a vector database of possibly domain-adapted embedding vectors that represent content pieces from a content store to achieve better accuracy than using the generic LLM embedding vector without domain adaptation.

Example 4. The method according to Example 1, where domain-adapted embedding vectors are used to improve the accuracy of semantic search to fetch content used for "grounding" a generically pre-trained large language model or generative AI system, thus producing a better result from the generically pre-trained generative AI system than could have been achieved without the domain-adapted embedding vector.

Example 5. The method according to Example 1, where the Large Language Model can be any system which takes in text and produces an embedding vector, including but not limited to a black-box LLM provided as a Software as a Service endpoint, or a neural network executed locally inside the domain-adapted embedding vector generator.

Example 6. The method according to Example 1, where the event received by the dictionary building system may be a regularly scheduled event (e.g., once a week), an ad-hoc request, the submission of new content to the domain content database, or the submission of one or more new queries from an associated user application.

Example 7. The method according to Example 1, where the domain term identification system is implemented by scanning the domain content for all unique terms, such as nouns, noun phrases, acronyms, proper nouns, verbs, etc. and calculating the embedding vector for each term in context (including the text before and after the term) and identifying those terms where the embedding vectors calculated from the domain-specific term in context varies significantly from the generic embedding vector of the term itself-both embedding vectors produced by the same Large Language Model (LLM).

Example 8. The method according to Example 1, where the domain term identification system is built from a log of poorly performing queries gathered from a user application, the where "poorly performing" is determined based on metrics including what positive actions such as purchasing products, reading, or sharing documents, clicking on a ratings system, etc. did or did-not occur for the query.

Example 9. The method according to Example 1, where the domain term identification system is a simple list of terms which have been manually entered by domain experts.

Example 10. The method according to Example 1, where gathering textual content for each domain-specific term involves fetching said content from a database of descriptions or definitions of domain-specific terms which have been manually entered, such as an encyclopedia, taxonomy or other text database.

Example 11. The method according to Example 1, where gathering textual content for each domain-specific term involves searching a corpus of domain-specific content for the domain-specific term and then gathering contextual text content which surrounds each use of the domain-specific term, and then using this content to construct the embedding vector for the domain-specific term.

Example 12. The method according to Example 11, where additional processing is performed on the contextual text content, such as filtering, summarizing (perhaps with a generative AI machine), cleansing, concatenating, translating or the like.

Example 13. The method according to Example 1, where combining the generic embedding vector from the large language model with the embedding vectors from the dictionary of domain-specific terms is performed using a weighted mean vector calculation.

Example 14. The method according to Example 1, where the embedding vector generator may return multiple vectors rather than a single vector, so that downstream applications such as vector indexing or semantic search can use more sophisticated similarity algorithms such as computing multiple similarity values and then combining them together with weights.

Example 15. The method according to Example 14, where the method of searching the semantic search engine could involve the similarity comparison of multiple vectors, and the weighted combination of those similarity comparisons to achieve the final relevancy score.

Example 16. The method according to Example 15, where the combination of the similarity comparisons may have been automatically determined by a statistical optimization technique (such as logistic regression) or a machine learning method using training data.

Example 17. The method according to Example 1, where the Dictionary Building System stores the textual description for each domain-specific term into the dictionary, and where these domain-specific terms and their textual descriptions are provided in the prompt to a Generative AI system to provide "grounding" of the Generative AI system to help it to accurately provide the requested information or perform the requested task.

Example 18. The method according to Example 17, where the domain-specific terms and their textual descriptions are provided along with content found by semantic search using domain-adapted vectors, both to the be used in the prompt provided to the Generative AI system to further provide the appropriate "grounding" for accurately performing the requested task.

Example 19. The method according to Example 17, where the textual descriptions of the dictionary terms contained in the input query are sent to a Generative AI system along with the original request and used to restate the query in a non-domain-specific way, this restated query used for generating the embedding vector used for semantic search and grounding, and also, optionally, to the Generative AI system to answer the user's original request.

What is claimed is:

1. A computer implemented method, the method comprising:
- receiving an input phrase for generating a domain-adapted embedding vector for the input phrase, using a domain-adapted embedding vector generator (DAEVG);
- scanning, using the DAEVG, the input phrase to identify one or more domain-specific terms from the input phrase that are included in a domain-specific dictionary;
- obtaining, from the domain-specific dictionary, using a domain term description generator, one or more domain-adapted embedding vectors and one or more term descriptions for each domain-specific term of the one or more domain-specific terms from the domain-specific dictionary;
- generating a generic embedding vector for the input phrase using a large language model, wherein the generic embedding vector is configured for storage in the domain-specific dictionary and subsequent use in semantic query processing, and wherein generating the generic embedding vector comprises:
  - providing the one or more term descriptions together with the input phrase to the large language model with instructions to rewrite the input phrase using the one or more term descriptions in a non-domain-specific phrase, and
  - generating, by the large language model, the generic embedding vector based on the non-domain-specific phrase; and
- combining, using the DAEVG, the generic embedding vector with the one or more domain-adapted embedding vectors to provide the domain-adapted embedding vector for the input phrase, wherein combining the generic embedding vector with the one or more domain-adapted embedding vectors includes performing a weighted mean vector calculation of the generic embedding vector with the one or more domain-adapted embedding vectors by applying weights to the respective vectors based on statistics that include frequency of occurrence of the respective domain-specific terms within the input phrase; and
- providing the domain-adapted embedding vector of the input phrase to a semantic search engine for executing of a semantic search over a vector search database to retrieve content related to the input phrase using the domain-adapted embedding vector of the input phrase.

2. The method of claim 1, wherein scanning the input phrase comprises:
- tokenizing the input phrase in sequences of tokens; and
- determining whether the sequences of tokens match domain-specific terms in the domain-specific dictionary.

3. The method of claim 1, wherein the generic embedding vector is a non-domain-adapted embedding vector generated for the input phrase as a whole.

4. The method of claim 1, wherein generating the generic embedding vector comprises:
- updating the input phrase by removing the domain-specific term or substituting the domain-specific term for generic replacements corresponding to a generic definition or description of the respective domain-specific term; and
- generating the generic embedding vector based on the updated input phrase.

5. The method of claim 1, comprising:
- building the domain-specific dictionary comprising:
  - identifying a list of domain-specific terms;
  - for each domain-specific term,
    - gathering textual content comprising a description or a definition of the respective domain-specific term; and
    - calculating, using a pre-trained language model, a domain-adapted embedding vector based on the textual content gathered for the domain-specific term; and
    - storing the domain-specific term and the domain-adapted embedding vector into the domain-specific dictionary.

6. The method of claim 1, comprising:
- providing the domain-adapted embedding vector for storage into a domain-specific vector search database, the domain-specific vector search database being provided for use for semantic search execution by an embedding vector similarity search.

7. A non-transitory computer-readable storage medium coupled to one or more processors and having instructions stored thereon which, when executed by the one or more processors, cause the one or more processors to perform operations, the operations comprising:
- receiving an input phrase for generating a domain-adapted embedding vector for the input phrase, using a domain-adapted embedding vector generator (DAEVG);
- scanning, using the DAEVG, the input phrase to identify one or more domain-specific terms from the input phrase that are included in a domain-specific dictionary;
- obtaining, from the domain-specific dictionary, using a domain term description generator, one or more domain-adapted embedding vectors and one or more term descriptions for each domain-specific term of the one or more domain-specific terms from the domain-specific dictionary;
- generating a generic embedding vector for the input phrase using a large language model, wherein the generic embedding vector is configured for storage in the domain-specific dictionary and subsequent use in semantic query processing, and wherein generating the generic embedding vector comprises:
  - providing the one or more term descriptions together with the input phrase to the large language model with instructions to rewrite the input phrase using the one or more term descriptions in a non-domain-specific phrase, and
  - generating, by the large language model, the generic embedding vector based on the non-domain-specific phrase; and
- combining, using the DAEVG, the generic embedding vector with the one or more domain-adapted embedding vectors to provide the domain-adapted embedding vector for the input phrase, wherein combining the generic embedding vector with the one or more domain-adapted embedding vectors includes performing a weighted mean vector calculation of the generic embedding vector with the one or more domain-adapted embedding vectors by applying weights to the respective vectors based on statistics that include frequency of occurrence of the respective domain-specific terms within the input phrase; and providing the domain-adapted embedding vector of the input phrase to a semantic search engine for executing of a semantic search over a vector search database to retrieve content related to the input phrase using the domain-adapted embedding vector of the input phrase.

8. The non-transitory computer-readable storage medium of claim 7, wherein scanning the input phrase comprises:

tokenizing the input phrase in sequences of tokens; and determining whether the sequences of tokens match domain-specific terms in the domain-specific dictionary.

9. The non-transitory computer-readable storage medium of claim 7, wherein the generic embedding vector is a non-domain-adapted embedding vector generated for the input phrase as a whole.

10. The non-transitory computer-readable storage medium of claim 7, wherein generating the generic embedding vector comprises:

updating the input phrase by removing the domain-specific term or substituting the domain-specific term for generic replacements corresponding to a generic definition or description of the respective domain-specific term; and generating the generic embedding vector based on the updated input phrase.

11. The non-transitory computer-readable storage medium of claim 7, wherein the instructions stored thereon which, when executed by the one or more processors, cause the one or more processors to perform operations comprising:

building the domain-specific dictionary comprising:

identifying a list of domain-specific terms;

for each domain-specific term, gathering textual content comprising a description or a definition of the respective domain-specific term; and calculating, using a pre-trained language model, a domain-adapted embedding vector based on the textual content gathered for the domain-specific term; and storing the domain-specific term and the domain-adapted embedding vector into the domain-specific dictionary.

12. A system, comprising:

a computing device; and a computer-readable storage device coupled to the computing device and having instructions stored thereon which, when executed by the computing device, cause the computing device to perform operations, the operations comprising:

receiving an input phrase for generating a domain-adapted embedding vector for the input phrase, using a domain-adapted embedding vector generator (DAEVG);

scanning, using the DAEVG, the input phrase to identify one or more domain-specific terms from the input phrase that are included in a domain-specific dictionary;

obtaining, from the domain-specific dictionary, using a domain term description generator, one or more domain-adapted embedding vectors and one or more term descriptions for each domain-specific term of the one or more domain-specific terms from the domain-specific dictionary;

generating a generic embedding vector for the input phrase using a large language model, wherein the generic embedding vector is configured for storage in the domain-specific dictionary and subsequent use in semantic query processing, and wherein generating the generic embedding vector comprises:

providing the one or more term descriptions together with the input phrase to the large language model with instructions to rewrite the input phrase using the one or more term descriptions in a non-domain-specific phrase, and generating, by the large language model, the generic embedding vector based on the non-domain-specific phrase; and combining, using the DAEVG, the generic embedding vector with the one or more domain-adapted embedding vectors to provide the domain-adapted embedding vector for the input phrase, wherein combining the generic embedding vector with the one or more domain-adapted embedding vectors includes performing a weighted mean vector calculation of the generic embedding vector with the one or more domain-adapted embedding vectors by applying weights to the respective vectors based on statistics that include frequency of occurrence of the respective domain-specific terms within the input phrase; and providing the domain-adapted embedding vector of the input phrase to a semantic search engine for executing of a semantic search over a vector search database to retrieve content related to the input phrase using the domain-adapted embedding vector of the input phrase.

13. The system of claim 12, wherein scanning the input phrase comprises:

tokenizing the input phrase in sequences of tokens; and determining whether the sequences of tokens match domain-specific terms in the domain-specific dictionary.

14. The system of claim 12, wherein the generic embedding vector is a non-domain-adapted embedding vector generated for the input phrase as a whole.

15. The system of claim 12, wherein generating the generic embedding vector comprises:

updating the input phrase by removing the domain-specific term or substituting the domain-specific term for generic replacements corresponding to a generic definition or description of the respective domain-specific term; and generating the generic embedding vector based on the updated input phrase.

* * * * *